(12) United States Patent
Rasori

(10) Patent No.: US 12,002,095 B2
(45) Date of Patent: Jun. 4, 2024

(54) MORTGAGE TRADING SYSTEM AND METHODS

(71) Applicant: Mortgage Capital Trading, Inc., San Diego, CA (US)

(72) Inventor: Philip Rasori, Healdsburg, CA (US)

(73) Assignee: Mortgage Capital Trading, Inc., San Diego, CA (US)

( * ) Notice: Subject to any disclaimer, the term of this patent is extended or adjusted under 35 U.S.C. 154(b) by 0 days.

(21) Appl. No.: 16/984,021

(22) Filed: Aug. 3, 2020

(65) Prior Publication Data
US 2023/0385930 A1    Nov. 30, 2023

Related U.S. Application Data

(60) Provisional application No. 62/882,521, filed on Aug. 3, 2019.

(51) Int. Cl.
*G06Q 40/04* (2012.01)
*G06Q 30/08* (2012.01)
*G06Q 40/02* (2023.01)

(52) U.S. Cl.
CPC ............. *G06Q 40/04* (2013.01); *G06Q 30/08* (2013.01); *G06Q 40/02* (2013.01)

(58) Field of Classification Search
CPC ......... G06Q 40/04; G06Q 30/08; G06Q 40/02
See application file for complete search history.

(56) References Cited

U.S. PATENT DOCUMENTS

| 5,995,947 A * | 11/1999 | Fraser ............... G06Q 40/00 705/38 |
| 7,433,842 B2 | 10/2008 | Toffey |
| 7,734,518 B2 | 6/2010 | Toffey |
| 7,742,966 B2 * | 6/2010 | Erlanger ............ G06Q 40/02 705/37 |
| 7,756,777 B2 | 7/2010 | Toffey et al. |

(Continued)

OTHER PUBLICATIONS

Mortgage Capital Trading Integrates its MCTlive! Secondary Software with Fannie Mae's Pricing & Execution—Whole Loan Application, Nov. 7, 2017, Neotrope, pp. 1-4 (Year: 2017).*

(Continued)

*Primary Examiner* — Kenneth Bartley
(74) *Attorney, Agent, or Firm* — Sheppard, Mullin, Richter & Hampton LLP

(57) ABSTRACT

Computer-based systems, platforms, and modules manage and sell securities such as mortgage loans and TBA positions for mortgage loans held by the system user, such as a lender, in the relevant market for such securities. A single system simultaneously negotiates transactions with multiple investors and broker-dealers for such securities. The computer-based systems generate best execution analyses of trades of loans and TBA transactions. The computer-based systems generate hedge recommendations based on the loans and loan commitments owned by the lender and automatically executes those hedge recommendations on a best execution basis without intervention. The computer-based systems allow for lenders to enter into contracts to sell loans to investors who are not qualified investors by locking the spread while allowing for the loan price to fluctuate until a trade is consummated.

12 Claims, 24 Drawing Sheets

(56) References Cited

U.S. PATENT DOCUMENTS

| | | | |
|---|---|---|---|
| 7,769,678 B2 | 8/2010 | Toffey | |
| 7,882,019 B2 | 2/2011 | Toffey | |
| 8,027,909 B2* | 9/2011 | Erlanger | G06Q 40/04 705/37 |
| 8,315,935 B2 | 11/2012 | Harrington | |
| 8,510,199 B1* | 8/2013 | Erlanger | G06Q 40/00 705/36 R |
| 8,533,099 B2 | 9/2013 | Devers et al. | |
| 8,650,111 B2 | 2/2014 | Harrington | |
| 9,786,006 B2 | 10/2017 | Kirby et al. | |
| 10,049,405 B2 | 8/2018 | Toffey et al. | |
| 2004/0039685 A1* | 2/2004 | Hambrecht | G06Q 40/04 705/37 |
| 2007/0250439 A1* | 10/2007 | Crocker | G06Q 40/02 705/38 |
| 2012/0078815 A1* | 3/2012 | Rossi | G06Q 40/06 705/36 R |
| 2012/0158573 A1* | 6/2012 | Crocker | G06Q 40/04 705/38 |
| 2012/0239593 A1* | 9/2012 | von der Borch | G06Q 40/00 705/36 R |

OTHER PUBLICATIONS

Mortgage Capital Trading's Bulk Acquisition Manager Technology Achieves 100 Percent Investor Adoption, Oct. 17, 2017, Neotrope, Inc., pp. 1-3 (Year: 2017).*

Financial Services Monitor Worldwide, "LendingQB and Mortgage Capital Trading Announce Enhanced Interface for Streamlined Secondary Marketing," May 12, 2016, SyndiGate Media, Inc., pp. 1-2 (Year: 2016).*

"MCT Introduces Bid Auction Manager Secondary Tape Transfer Tech," https://mct-trading.com/mct-introduces-bulk-acquisition-manager-secondary-marketing-tape-transfer-technology/, Press Release, Jul. 18, 2017.

"MCT's Bid Auction Manager Technology Achieves 100 Percent Investor Adoption," https://mct-trading.com/bam-investor-adoption/, Press Release, Oct. 16, 2017.

"MCT Wins Progress in Lending Association's 2018 Innovation Aware for its New Bid Auction Manager (BAM) Whole Loan Trading Technology," https://mct-trading.com/bam-technology-innovation-award/, Apr. 17, 2018.

"LendingQB Integration with MCT Bid Auction Manager Improves Secondary Marketing Processes for Mutual Clients," https://mct-trading.com/lendingqb-integration/, Press Release, May 20, 2018.

"Eustis Mortgage Upgrades Loan Sales Process With BAM," https://mct-trading.com/case-study-timothy-ieyoub/, Blog, Case Studies, Apr. 27, 2018.

"Bid Tape Management & Best Execution for Lenders," https://mct-trading.com/bid-auction-manager/, Jun. 26, 2018.

"MCT's Bid Action Manager (BAM) Technology Automates Tri-Party Agreement for Investors' Bid Tape AOT Loan Sale Executions," https://mct-trading.com/tri-party-agreements-bid-tape-aot/, Press Release, Aug. 2, 2018.

"MCT Adds Investors to Bid Tap AOT Tri-Party Agreement Automation in its Bid Auction Manager (BAM) Platform," https://mct-trading.com/assignment-of-trade-aot/, Press Release, Oct. 5, 2018.

"MCT Officially Launches Trade Auction Manager to Enable Electronic TBA MBS Trading," https://www.send2press.com/wire/mct-officially-launches-trade-auction-manager-to-enable-electronic-tba-mbs-trading/, Press Release, May 16, 2019.

"Digitize and Democratize TBA Trading," https://mct-trading.com/trade-auction-manager/, Jun. 3, 2019.

"Case Study: Mountain West Financial Improves Efficiency & Improves Margins With Trade Auction Manager (TAM)," https://mct-trading.com/case-study-mountain-west-financial/, Blog, Case Studies, Featured, Nov. 8, 2019.

"MCT to Unveil MSRlive! Platform That Accurately, Easily and Quickly Values Servicing Portfolios," https://mct-trading.com/mct-unveil-msrlive-platform-accurately-easily-quickly-values-servicing-portfolios/, Press Release, Oct. 24, 2018.

"Mortgage Servicing Rights Software—MSRlive!," https://mct-trading.com/solutions/msr-valuation/msrlive/, Nov. 13, 2018.

"2021 HW Tech100 Mortgage Award Announces MCT as Leader in Innovation," https://mct-trading.com/mct-wins-2021-hw-tech100-award/, Press Release, Mar. 29, 2021.

James Vickery et al., "TBA Trading and Liquidity in the Agency MBS Market," FRBNY Economic Policy Review, May 2013.

* cited by examiner

| Bid Investor | Bid Auction Manager | | | |
|---|---|---|---|---|
| | Posted | Uploaded | Confirmed | Commit |
| AIG Bulk | | | | |
| Amerihome Bulk | | | | |
| Bank of Paul | (09/14/2018 09:00:24) | (09/14/2018 09:03:05) | | |
| Color Report | | | | |
| Caliber Bulk | | | | |
| Chase Bulk | | | | |
| Citi Bulk | | | | |
| CMG Bulk | | | | |
| Fannie Cash Pingora Bulk | | | | |
| FGMC Bulk | | | | |
| Franklin Bulk | | | | |
| Freddie Bulk | | | | |
| Freedom Bulk | | | | |
| Homepoint Bulk | | | | |
| Lakeview Bulk | | | | |
| Mr Cooper Bulk | | | | |
| Penny Mac Bulk | | | | |
| Plaza Bulk | | | | |
| Suntrust Bulk | | | | |
| Texas Capital Bulk | | | | |
| TMS Bulk | | | | |
| Wells Fargo Bulk | | | | |

| | | Loan Data | | | | |
|---|---|---|---|---|---|---|
| Status | Loan Number | Borrower Name | Program | Interest Rate | Loan Amount | Investor |
| Active | 1921807145324 | May III | Con 30 | 4.8750 | 251,780 | Bank of Paul |
| Confirmed | 2101718180563 | Roche | Con 30 Homestyle | 5.1250 | 148,790 | Bank of Paul |
| Active | 2101807145928 | Moreira | FHA 30 II | 4.5000 | 319,444 | Bank of Paul |
| Confirmed | 2501787112217 | Lynch | Con 30 Homestyle HB | 4.3750 | 545,000 | Bank of Paul |
| Active | 2501805143173 | Davis | Con 30 NY | 4.6250 | 409,900 | CMG Bulk |
| Active | 2501805145208 | Dhillon | Con 30 HB | 4.7500 | 570,600 | Bank of Paul |
| Active | 2501808147028 | Costanzo | Con 30 HB | 4.9900 | 679,550 | Bank of Paul |
| Active | 2501805145578 | Carrier | Con 30 Home Possible | 4.6250 | 213,780 | Bank of Paul |
| Active | 3951807145224 | Jauriga Funcora | Con 30 Home Possible Adv | 4.6250 | 153,380 | Amerihome Bulk |
| Active | 3951807145287 | St Louis | Con 30 | 4.7500 | 199,750 | Bank of Paul |
| Active | 3951807145243 | Hernandez Piloto | Con 30 LL3 150 | 4.7500 | 150,000 | Bank of Paul |
| Active | 4001808144713 | Blount | Con 30 | 4.7500 | 338,000 | Bank of Paul |
| Active | 4001808146700 | Ali | Con 30 | 4.5000 | 249,400 | Suntrust Bulk |
| Active | 4001808147083 | Kerns | Con 30 | 4.6250 | 332,000 | Bank of Paul |
| Confirmed | 4211805143408 | Radzionau | Con 30 | 4.8750 | 266,380 | Bank of Paul |
| Active | 4221807145509 | VanHoose | Con 30 | 4.7500 | 259,280 | Bank of Paul |
| Active | 5001805146740 | Chapman | Con 30 | 4.7500 | 269,800 | Wells Fargo Bulk |
| Active | 5251807146482 | Chestnut | FHA 30 II | 4.6250 | 201,286 | Bank of Paul |
| Active | 5501807145778 | Jeewek | Con 30 | 4.7500 | 300,000 | Bank of Paul |
| Active | 5501808147149 | Bryce | Con 30 | 4.7500 | 615,000 | Bank of Paul |

Total Volume $6,355,080.00 Total Units 20

MORTGAGE TRADING SYSTEM AND METHODS

CROSS-REFERENCE TO RELATED APPLICATIONS

This application claims priority to U.S. Provisional Application No. 62/882,521, filed Aug. 3, 2019, which is hereby incorporated by reference in its entirety.

FIELD OF THE INVENTION

The present technology relates to one or more computer systems and/or trading platforms and related methods for obtaining, storing, organizing, auctioning, providing data and information, and for calculating pricing and exchanging data and information, and for the assignments of trades and/or purchase and sale commitments of securities (which can include but are not limited to mortgage loans in the secondary market), to enable the purchase, sale, trading, hedging and/or aggregation of such securities, including for the purpose of investment and/or the creation of by way of example, mortgage-backed securities.

BACKGROUND

There is a robust market for the buying and selling (i.e., trading) of financial-related securities. These securities can include stocks and bonds, as well as more sophisticated securities such as loan mortgages, mortgage backed securities, swaps, derivatives and other securities known to those of skill in the art. Looking for example, but without limitation, to mortgages on real property, they represent loans obtained by the owner of the real property from a third party in which repayment of the loan is secured, in whole or in part, by a lien on the real property. Lenders who make such loans often desire to sell the loan to a third party Investor who will receive the periodic repayment of the principal and the payment of interest on the loan for the life of the loan.

The price at which a loan is sold to an Investor varies based on, among other things, the term of the loan and the interest rate which applies to the loan. Interest rates can fluctuate during a day, and certainly during the time between when a mortgage loan interest rate is locked by the Borrower and the date on which a loan is funded by the Lender. This represents one of the substantial risks in the markets for loans in the secondary mortgage market as a type of security for which the systems, platforms and associated methods of the present disclosure can be used, given that the prices for such securities fluctuate regularly and are subject to volatility. Thus, a portfolio of loans held by a Lender may be more or less valuable based on current market conditions. This volatility is part of the reason why Lenders often use hedge transactions to ameliorate these risks. Pricing, and thus volatility, is quantified in basis points. One basis point is one one-hundredth of one percent. By way of example, 25 basis points=0.25% and 100 basis points=1%.

Broker-Dealers extend a credit line to Lenders for their loan portfolio which if the values of the loans in the Lender's portfolio drops below a certain level, the Broker-Dealer can or will make a capital call or margin call on the Lender. This can occurs when Lenders want to sell loans that are "out of the money" (i.e. have a value less than face value) or may be forced to sell such loans or make a margin call payment to the Broker-Dealer. Out of the money loans are "marked to market" by the Broker-Dealer (i.e., the value of the loan is adjusted in the portfolio analysis to the market price rather than the face value) and if there is a shortfall above the credit limit set by the Broker-Dealer, as is understood in the industry a margin payment will typically be required.

The bid-offer (or ask) spread is the difference in price between the bid and offer quotations, which strongly influences transaction costs associated with trading and hedging positions (e.g., the commission(s) or fee(s) a Lender is charged by others when a loan is sold into the secondary mortgage market). These costs vary based on the type of instrument and the nature of the transaction for the disposition of that instrument. There are also preferential customer rates, incentives and other forms of cost variations that are applicable to understanding determining the value of a particular trade, sale or assignment of a financial instrument, such as a loan.

As part of the marketplace for the sale of mortgage loans by Lenders to Investor in the secondary mortgage market, an interest in one or more mortgage loans can be sold in the "To-Be-Announced" ("TBA") market or on an "Assignment of Trade" ("AOT") basis. TBA mortgage-backed securities are typically forward contracts on Agency (such as a GSE) Mortgage-backed securities where the price is set for loans having particular terms or characteristics but the actual loans are not identified. The TBA market creates parameters under which mortgage pools can be considered fungible and thus do not need to be explicitly known at the time the trade is executed. Thus the term "To-Be-Announced." This market is based on the fundamental principle that one type of mortgage-backed securities pool ("MBS") can be considered interchangeable with another pool. The TBA market has become the most liquid and consequently the most important secondary market for mortgage loans.

Trade settlements on TBA trades with Broker-Dealers can be scheduled as far out as 3 months into the future. As a result, the TBA market provides a critical market function by enabling mortgage Lenders to price and hedge their origination pipelines. Lenders can lock-in the price for the mortgage loans that are undergoing the origination process and hedge the risk that interest rates may change. The market's liquidity creates important market efficiencies for Lenders. Short selling TBA loans is a method a Lender can use to hedge the interest rate risk associated with locked loan rates on funded loans in the Lender's portfolio or on locked rate commitments to Borrowers for unfunded loans being processed.

The mortgage loan Broker-Dealer community, particularly in the To-Be-Announced market for the sale of mortgage loans, is made up of primary and regional Broker-Dealers. Primary Broker-Dealers have extremely high net worth requirements for setting up trading lines. As such, primary Broker-Dealers focus their attention and trading lines on chartered depositories and large institutions.

In contrast, regional Broker-Dealers have net worth requirements as low as, for example, $1 mm in equity. As such, regional Broker-Dealers provide trading line liquidity to the small to midsize independent mortgage Lenders that make up 60% of the United States mortgage market. However, regional Broker-Dealers do not trade as participants on the primary Broker-Dealer platforms. Instead, all trades in the To-Be-Announced market would historically be conducted by telephone, secure email or fax.

For more than the last 40 years, in these secondary markets small to midsized Lenders would contact two or three Broker-Dealers for bids, if the Lender had time. This process is infeasible in a fast moving market and is not practical for a large number of trades. As a result, the vast majority of trades executed by small to midsize Lenders in the To-Be-Announced market over the past 40 years were only sent to one or two Broker-Dealers since small to midsize Lenders were not able to achieve a best execution of their To-Be-Announced bids through a broad array of potential buyers. This has caused a substantial reduction in Broker-Dealer bid-offer spread efficiency and artificially restricting the market for TBA securities.

The disclosed computer systems and platform and the methods associated therewith provide proprietary tools which enable mortgage Lenders of any size to manage interest rate and product risk in conjunction with the origination and sale of residential mortgage loans into the secondary mortgage markets. These systems, platforms and associated methods can be applied to various securities and are not limited by the examples discussed herein related to mortgage loans and the secondary loan market.

There is a need for one or more of the disclosed computer systems and methods associated therewith to enable Lenders to sell loan commitments to Investors in a manner that minimizes the opportunities for errors, maximizes the efficiency, provides immediate access to the critical information needed to strike a deal between a Lender and an Investor and which simultaneously shortens the time between the negotiation and the closing of the sale of a loan, or group of loans, to one or more Investors by a Lender.

Another object of one or more embodiments of the computer systems, platforms and associated methods of the present disclosure include providing recommendations on the best execution available to the user which will maximize the value of the loan(s) or other security (e.g., a TBA contract) being sold by considering the best matches for all or part of the loans based on the Lender/Sellers entire holding of securities or loans, any special rates or proposals offered by any particular bidder, the costs to the Seller/Lender of hedging the loan or security pending the sale thereof.

Another object of one or more embodiments of the computer systems, platforms and associated methods of the present disclosure include identifying the best short position(s) available to the Seller/Lender base on factors that include the market pricing, the Lender/Sellers inventory of securities or loans, the costs associated with the various short positions including positions currently held by the Seller/Lender and other factors described herein.

Another object of one or more embodiments of the present disclosure include the ability for a Lender/seller to have a single end-to-end system platform and modules solution that provides recommendations from, for example, the time a loan commitment is originated to the disposition of the loan in to the secondary loan market based on market conditions, costs and the Lender/Seller's total portfolio, including the hedging of such loans and loan commitments while they are in the Lender's portfolio.

Another object of one or more embodiments of the present disclosure includes expediting the transfer of a loan or security once a transaction is executed between the parties. Thus, one or more embodiments of the system, platform and related methods of the present disclosure creates the ability for Lenders/Sellers to lock a transaction with a buyer/Investor by electronic correspondence through a multi-step set of communications that enables the transfer of the purchased security or loan nearly immediately after the successful purchaser is identified.

Additionally, another object of one or more embodiments of the present disclosure includes expanding the number and market participation of Lenders/sellers, buyers/Investors and Broker-Dealers who can engage in transactions to encompass the entire pool of interested Sellers, Investors, Broker-Dealers and buyers regardless of their prior relationship. These embodiments and related methods enable the Lender/seller to enter into a transaction to sell a security (such as a mortgage loan) to a buyer/Investor where the Lender and/or the Investor are not approved by the other to execute a sale transaction by providing a Security Spread lock that protects the relative positions of each party even though the price of the loan or other security continues to fluctuate with market conditions until the parties are qualified to consummate the transaction. Other embodiments addressing this object are disclosed herein.

Another object of one or more embodiments of the present disclosure includes allowing Lenders to provide data to Investors, including Investors who are competitors of the Lender for making mortgage loans, in manner that secures the data identifying the borrower and the property address while enabling Investors to provide bids on the loans to protect the loan from any attempt by such Investors to use the data to refinance the loan. Thus, under one or more embodiments of the platform, system and associated methods of the present disclosure, detailed identification of the borrower and the property to which the loan applies is only supplied to the winner bidder for that loan and not to any other Investors.

Other and more detailed objects and advantages of the computer system(s), platforms, modules and methods associated therewith of the present disclosure will be apparent to persons of skill in the art from the disclosure and the Figures.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

DESCRIPTION OF THE FIGURES

Figure 4:
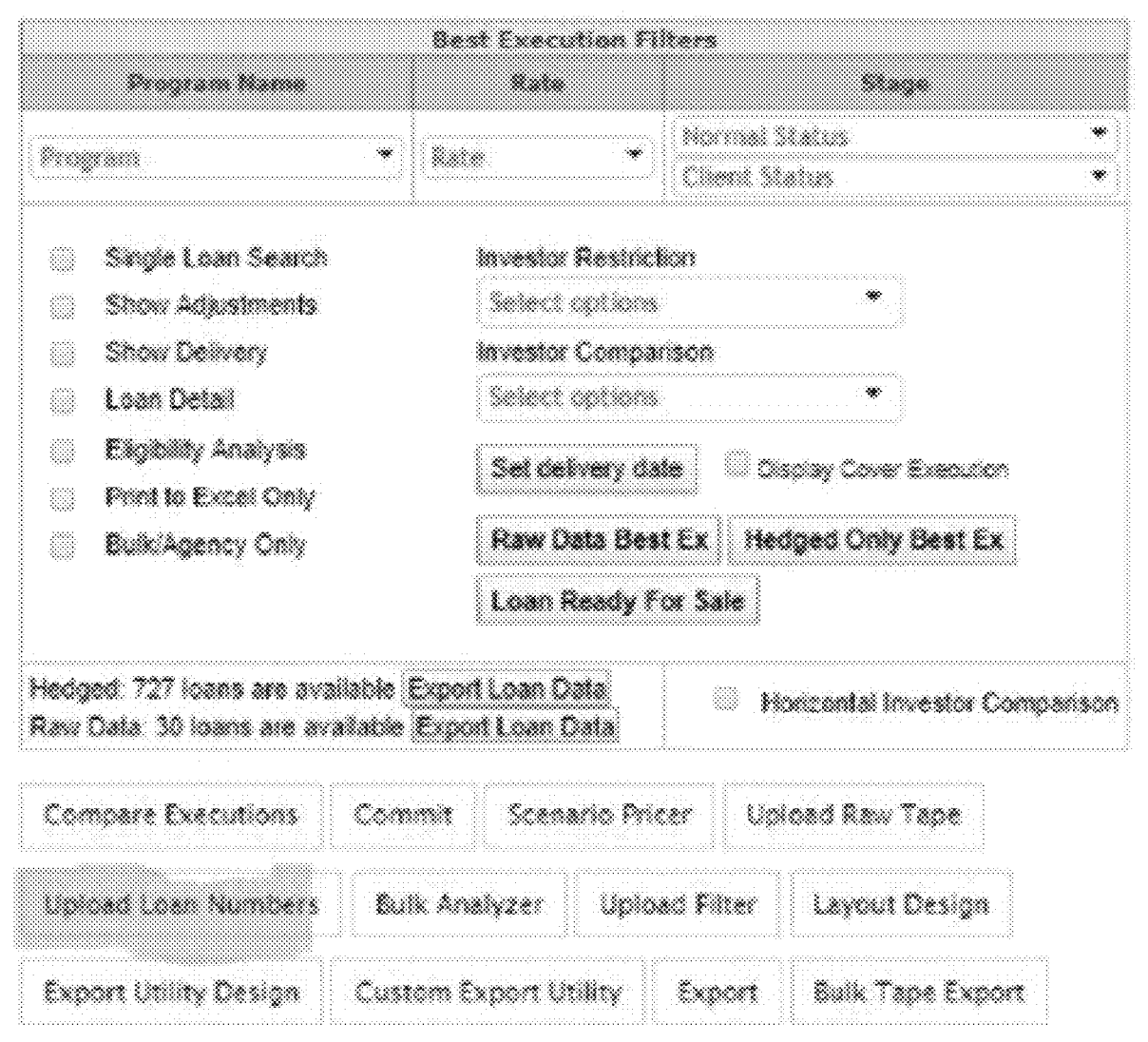
Figure 5:
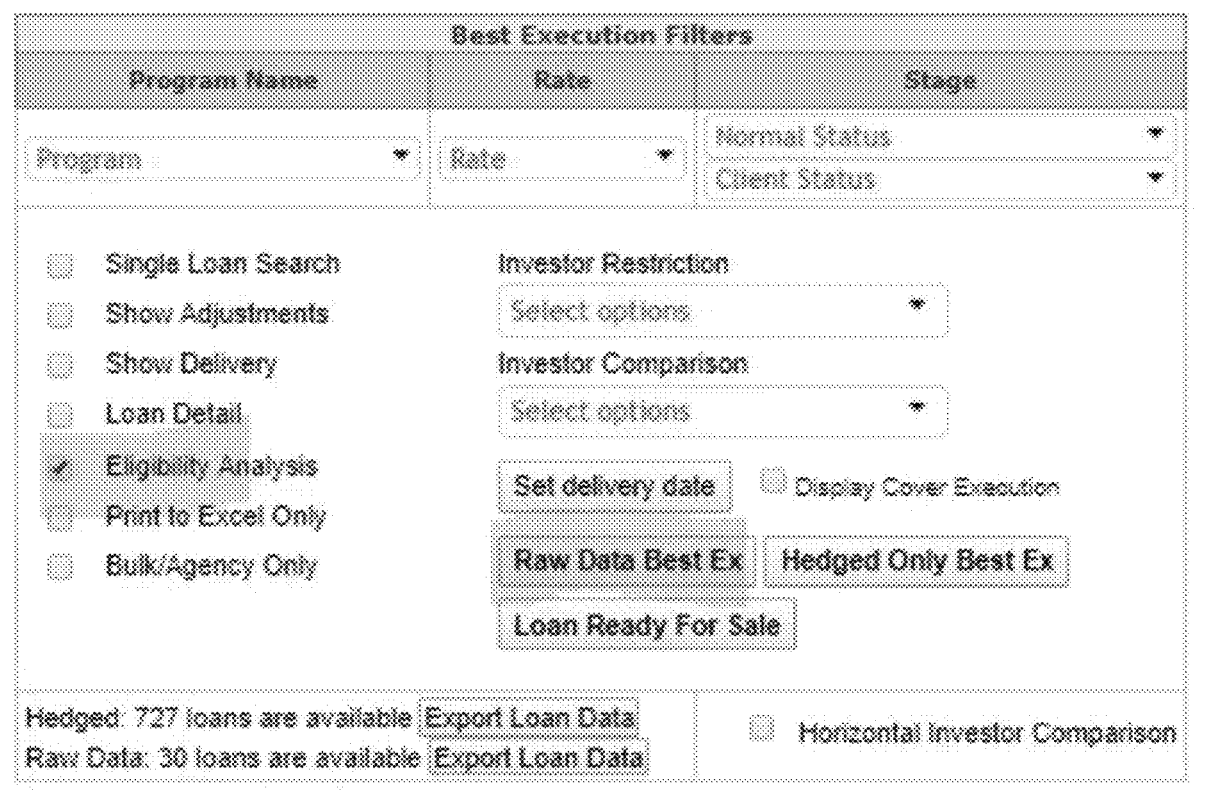
Figure 6:
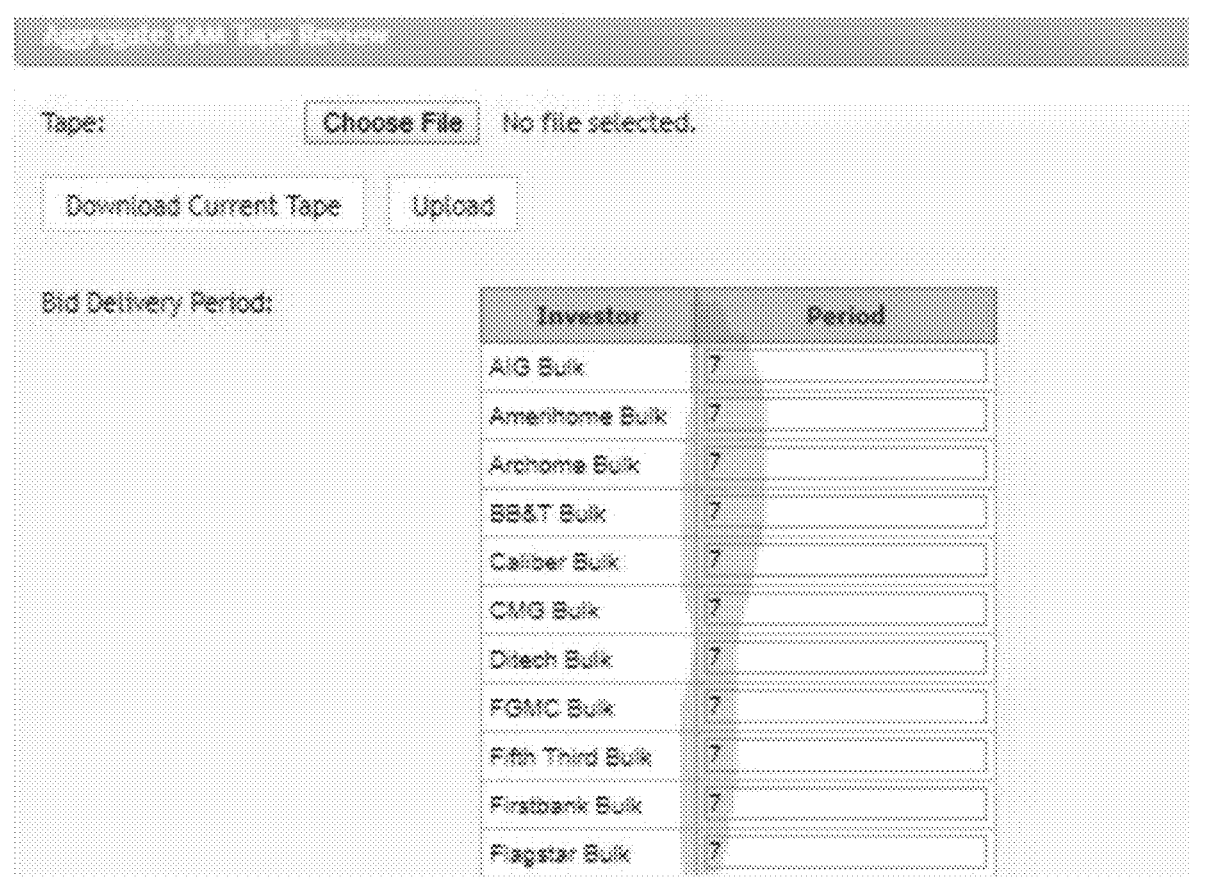
Figure 10:
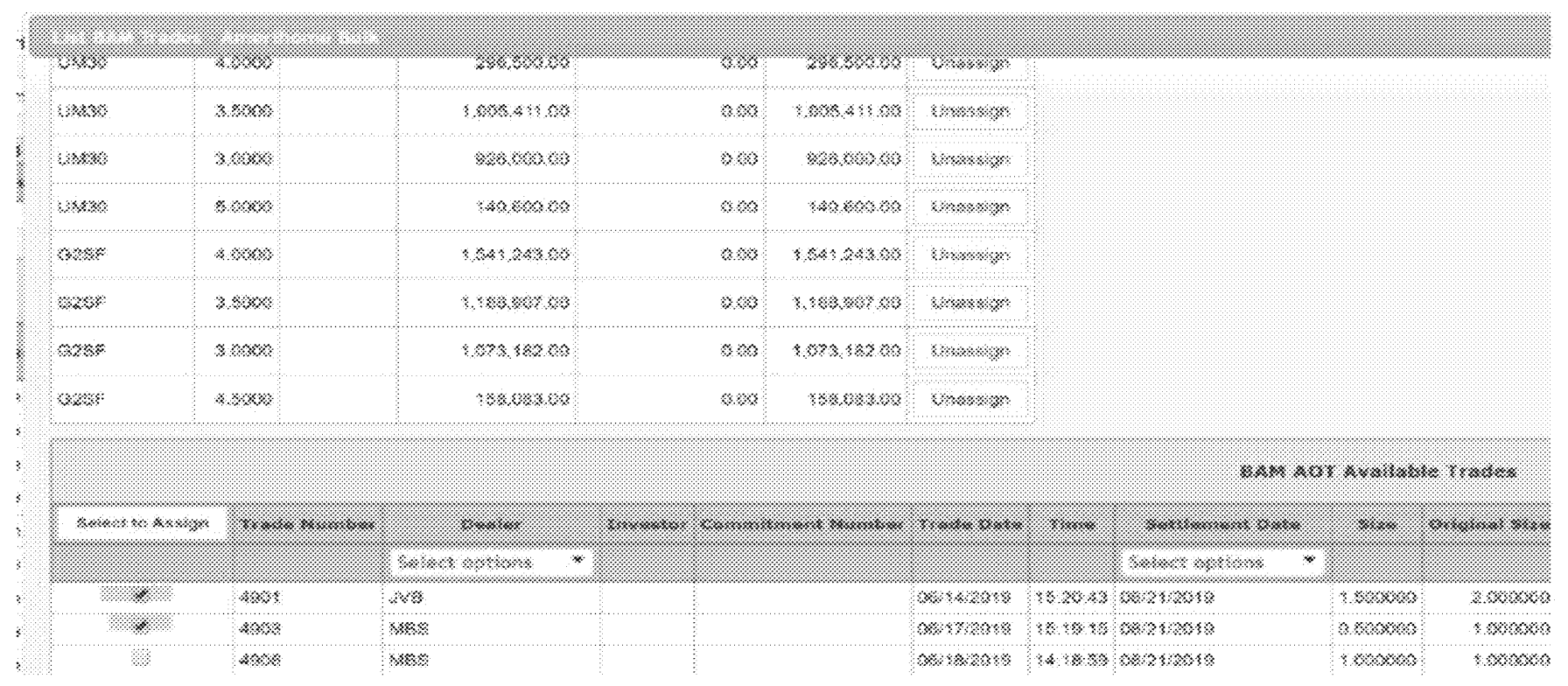

FIGS. 4-11 are illustrative screen shots showing how a user uses one or more embodiments of the computer system(s), platforms and associated methods of the instant disclosure in the BAM module to conduct a BAM-AOT transaction including where a Best Ex analysis is employed;

FIGS. 12 and 13 are illustrative screen shots showing the execution of one or more alternative embodiments the BAM platform systems and associated methods of the present disclosure;

DETAILED DESCRIPTION

Figure 1:
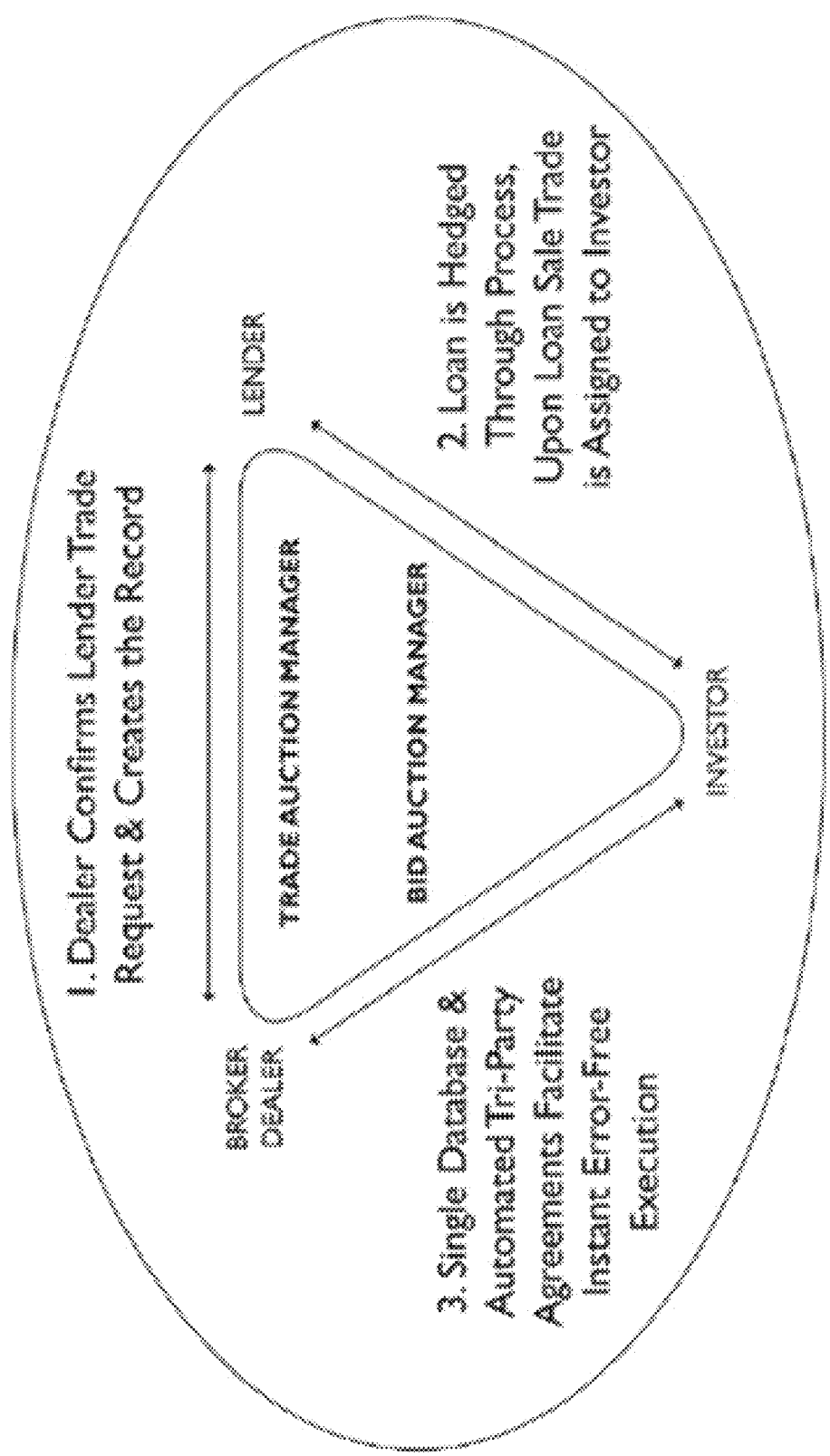
FIG. 1 is an overview illustrating one or more embodiments of the collaborative but independent modules of the computer system(s), platforms and associated methods of the instant disclosure.

The disclosed computer systems and methods associated therewith provide a mortgage loan management platform with various features and advantages that enable users to achieve more efficient and transparent execution at various hedging and loan sale transaction intersections. As illustrated herein, one or more embodiments of a master platform disclosed herein can be referred to as MCTLive!®. The various disclosed embodiments and modules of the computer systems and methods associated therewith provide a secondary mortgage market system and platform that likewise drastically reduces the risks of errors and allows Lenders to effectively maximize the value of the loans they originate when they are sold to Investors in one or more secondary mortgage markets.

The disclosed computer systems and methods associated therewith materially enhance and transform the activities and ability of participants to maximize the benefits and value of participation in exchange and non-exchange traded financial markets. Certain embodiments make those markets more operationally efficient as well as more price efficient for participants in the markets. For example, applying one or more embodiments of the disclosed computer systems and associated methods to the secondary mortgage market materially enhances and transforms the activities and the ability of Lenders to maximize the benefits and value to the Lender through the transfer of loans to Investors in the market. In so doing, embodiments can provide, among other benefits, unprecedented transparency and data flow to the market.

The benefits of the computer systems, platforms, modules and associated methods of the present disclosure can accrue in other exchange traded financial markets. Likewise, other embodiments can create these benefits within non-exchange traded financial markets. These markets can include, for example and without limitation, the trading, buying or selling of various loan types such as jumbo or spec loans, as well as for pool eligible loans, and non-agency eligible loans. Thus, embodiments of the computer systems, platforms and associated methods of the present disclosure can be applied to markets for trading, buying and/or selling of other financial instruments or interests to receive similar advantages as those disclosed herein for the secondary mortgage related markets (including as between Lenders and Investors, and between Lenders and Broker-Dealers). Such instruments can include, without limitation, the trading, buying or selling of treasury certificates or instruments, options on treasury instruments or certificates, TBA options, jumbo loans, non-agency eligible loans, spec loans, pool eligible loans and other non-TBA instruments.

The benefits provided to the parties by the embodiments of the computer systems and associated methods disclosed herein include one or more of allowing the parties to have access to real-time competitive bidding on the instrument, such as a mortgage loan or a TBA security. One or more embodiments of the computer systems and associated methods also provide Lenders (or the seller) with recommendations on the best execution strategy (or "Best Ex") for the disposition of the instrument or asset (e.g. one or more loans or loan commitments) from the point of view of the Lender (or the seller) of the instrument(s) in or to a market for the instrument(s).

As discussed more fully below, for many of the embodiments of the systems, platforms modules and related methods of the present disclosure, there are four basic communications associated with the sale or trade of a loan or security using one or more embodiments of the computer systems, platform and associated methods of the present disclosure. These communications include: 1) a Lender submits a trade (of a loan, a TBA, or other security) for the applicable buyers (e.g., Investors or Broker-Dealers) to propose a price level, 2) the buyer posts a price level on the trade offered by the Lender, 3) the Lender requests a confirmation of the trade from the buyer, 4) and the buyer confirms the purchase of the security. In addition to the above communications, various embodiments of the systems, platforms modules and associated methods of the present disclosure utilize additional communications (for example in connection with a Spread Security lock) as discussed more fully below.

As set forth herein, the disclosed computer systems, platforms, modules and methods associated therewith evaluate various factors associated with the instruments at issue (e.g., a portfolio of loans) that can be transferred by assignment and/or by direct transfer to identify a best execution strategy. Thus, by way of example and without limitation, one or more embodiments of the computer system, platforms and associated methods of the present disclosure factor in various issues for consideration which can impact the total value of the transaction. This includes savings on commissions associated with alternative disposition of the instrument rather than an AOT, any Lender incentives offered by one or more Investors, the savings a Lender can achieve by making one or more TBA trades and/or AOT transactions rather than a direct transfer, and any other concerns or issues for the Lender's total evaluation of the value of the proposed bids on the Lender's entire holdings.

Assignment of Trade ("AOT")

In the context of the sale of mortgage loans, an AOT is a transaction where the originator sells a loan or pool of loans to an Investor while simultaneously assigning an appropriate and acceptable open TBA trade the originator has with a Broker-Dealer to the Investor. The execution price the Investor would pay the originator gets market adjusted for the movement of the trade(s) being assigned over to produce the final adjusted price. This process eliminates the bid/ask spread that the originator would normally expect to incur from the Broker-Dealer from pairing out of the trades themselves rather than assigning.

Because an AOT involves three parties, Lenders engaging in AOT transactions must enter into a mutually acceptable tri-party agreement between Lender, AOT Investor and the Broker-Dealer. In a typical AOT, the Lender delegates Lender's obligation to deliver certain mortgage-back securities ("Securities") to the Broker-Dealer and assigns the Lender's right to receive payment of a certain agreed upon price of the Securities from the Broker-Dealer ("Assigned Transactions"). This typically takes the form of the Lender delivering loans pertaining to the corresponding coupon, product and settlement month as part of the Assignment of Trade. The settlement month is determined by the Investor's delivery schedule and the original price of the assigned trade is the basis for the loan pricing. The tri-party agreement must define the process to settle net money differences, if any, between the Assigned Transactions and any other transactions involved, or where the AOT involves other transactions that are assigned or assumed associated with the security at issue.

In one or more embodiments of the above computer systems, trading platforms and associated methods, acceptance of AOT offers can occur through one or more interactive embodiments of the BAM and TAM platform module components or an alternative secure communication media acceptable to Lender and the AOT Investor. When accepting an Investor offer through one or more embodiments of these module components, the Lender is responsible to accept or decline such offer within the terms and conditions established by each respective Investor.

As discussed above, one or more embodiments of the BAM module trading platform component also enables the parties to enter into a tri-party agreement and supporting documentation concurrently in conjunction with an AOT transaction. To do so, each participant's data format must be mapped to the BAM trade execution system module and each participant must load the BAM module Bid Tool API into the participant's supporting systems. Delivery of any additional documentation, and the transfer of funds, between Lender and the AOT-Investor occurs outside of the BAM module through established communication and banking channels between the parties.

The benefits of an AOT as provided by the system, platform and associated methods of one or more embodiments of the present disclosure is cash flow management and having on a single cash experience for the Lender as the settlement of the assigned trade disappears and is effectively netted into the loan purchased price. By way of example in the mortgage loan secondary market, assume the AOT involves $2 million in assigned Fannie 4.5s. The original price was 101.375 but the current corresponding loan execution is at 101.875. Assume that the current market for Fannie 4.5s is 102.375. Thus, this trade has a 100 bps or $20,000 loss associated with it. But, when assigned, the trade basis will take the loan value from 101.875 to 100.875, thus reducing the loan execution by 100 bps. This netting of the loan values and costs through the AOT assignment materially impact the overall cost to a Lender in the transaction of selling a loan into the secondary mortgage market.

In addition, one or more of the embodiments of the present disclosure permit the parties to concurrently enter into the tri-party agreement with the agreement to the terms of the AOT transaction. This facilitates multiple changes to the AOT process employed by legacy users.

First, the features and methods of the one or more embodiments of the present disclosure enables the Lender to immediately pair off the hedge on the loan(s) transferred thought the AOT. Second, it passes the risks of loss or gains onto the Investor as of the completion of agreement to the trade terms. Under the legacy applications of AOT transactions, the Lender would need to deliver between 50% to 100% of the loan amount as collateral before the Investor would assume the risks of ownership of the AOT positions. This made mark to market evaluation more difficult as loans which had been sold in AOT transactions would still be in the Lender's portfolio for this evaluation and potential margin capital calls from Broker-Dealers based on changes in the market for loans which had been sold, but which the Investor had not taken possession of the risk of ownership.

Next, the features and methods of the one or more embodiments of the present disclosure enables the Lender to blend the loans associated with an AOT transaction for either an over assignment or under assignment of loans. For example, under the restrictions of the legacy prior art applications, the AOT trade had to be within a 1%-2% tolerance of the loan amount that was part of the AOT trade. This made AOT trades virtually unavailable to smaller Lenders. But the system, platforms, modules and methods of one or more embodiments of the present disclosure enable either an over assignment or under assignment of loans as part of an AOT trade. Thus, assigning a $1 million trade against $1,800,000 in loans or assigning a $1 million trade against $505,000 in loans are both permitted. The system, platforms and methods of one or more embodiments of the present disclosure loans enable the loans to be priced accordingly on a weighted basis.

In addition, the computer systems and associated methods allow for loan pricing of a portfolio to allow for the price of the loans to reflect whether the loan is in the money or out of the money. Additionally, embodiments of the computer systems and associated methods permit the Seller to blend the pricing of instruments being sold (e.g., loans) to meet the particular requirements of different Lenders in real time. These are material enhancements of the AOT trade processes and dealings that have heretofore been unattainable or unavailable to Lenders. Instead, the systems of the prior art require multiple applications and multiple data transfers between such applications, and often the manual communication of information by telephone, secure email or fax, resulting in the opportunity for errors to enter into the system and which unnecessarily consumed human or computer resources. These legacy systems and practices also artificially constricted the number of participants who could participate in a transaction, thus reducing competitive bidding and better pricing for Lenders.

The systems, platform(s) and associated methods of one or more embodiments of the present disclosure are also able to provide suggestions to the Lender of which trades will maximize the total value of the loan transfers by the Lender and avoid, for example, the application of a bid/offer spread by the Broker-Dealer as part of the transaction. The Lender then has the ability to accept the Best Execution strategy determined by the disclosed computer systems and methods associated therewith or to accept particular loan transfers as the Lender determines to be best for those loans and the needs of the Lender.

Various embodiments of the computer systems, platform(s) and methods associated therewith can similarly and equally provide benefits to any opaque market, including any non-TBA market to provide enhanced transparency and data flow that promotes competitive bidding on all levels.

By way of example, and without limiting the scope of the disclosure or the applicability of the computer systems and associated methods disclosed herein, prior to the computer system and associated methods as disclosed herein in one or more embodiments, Lenders would have to use disparate systems and personnel to participate in the bid tape process for the sale of loans or TBA instruments. This increased the cost of such activities, opened the process up to multiple points of error insertion (whether by "fat finger" mistakes, errors associated with numeric transpositions or erroneous transcription of data, and other known types of errors caused by humans), and provided a much less efficient ability to participate in the secondary mortgage market.

In addition, Lenders were typically limited to soliciting bid from a small number of Investors as the time pressure created by market volatility makes it impossible to contact more Investors and receive bids within an acceptable time. Thus, Lenders might only be able to solicit bids from no more than 3-5 Investors, and often only 1-2 Investors. In addition, the data regarding the loans being sold, highly confidential data of the Borrower and the Lender, was subject to the insecure transmission via fax or email. The delivery time for payment was typically on the order of 15 days, and the process for completing a transaction, subject to the execution of a tri-party agreement, was in the range of 2-4 hours.

In contrast, in the computer system(s), platform(s) and associated methods disclosed herein, the process is seamless and there are virtually no opportunities for human error of mis-identification, numeric transposition of human "fat finger" mistakes. Additionally, the computer systems, platform(s) and associated methods enables the Lender to solicit bids from full slate of Investors, including shadow bids, with total data privacy and security. The system also provides the Seller/Lender with real-time information and with an analysis of a best execution strategy that considers factors that were not able to be considered by Lenders or the prior systems before the disclosed computer systems and associated methods as disclosed herein. Finally, one or more embodiments of the computer systems, platforms, modules and associated methods disclosed herein permit any Investor to present a valid bid on a loan offered for sale by a Lender regardless of whether that Investor is qualified to transact loans with the Lender. These and other improvement described herein have provided significant efficiency gains to the marketplace for secondary mortgages as well as enhanced profitability to Lenders or other selling, trading or assigning financial instruments in the applicable market. Thus, for example, a Lender can expect delivery on the transaction (including payment) within approximately 7 days, cutting the time by more than 50% over the prior trading without the computer systems, platform(s) and associated methods of the instant disclosure.

Collaborative but Independent Systems.

FIG. 1 is illustrative of one or more embodiments of one or more computer systems, platforms and associated methods of the present disclosure. The present systems, platforms and associated methods represents a new technology that is saving Lenders time and improving their pick up on loan sales in the secondary market. As illustrated in FIG. 1, Lenders are able to engage in the sales of securities, such as mortgage loans in the secondary loan market, with Investors using the systems, platforms and associated methods referenced as the BAM trade execution system or BAM-AOT trade execution system platform module component, and with Broker-Dealers using the systems, platforms and associated methods referenced as the TAM trade execution system platform module component of the present disclosure. These systems, platform and associated methods are, in the preferred embodiments, operating within a master platform and database, referenced for convenience and example only, as MCTLive!®. For purposes of example but without limiting the scope of the disclosure contained herein, the TAM system platform module and related methods are used to buy and sell long and short positions to/from Broker-Dealers based on existing loans identified for sale. This is often done via TBA trades. The BAM system platform and related methods is used to buy/sell loans and loan commitment to Investors, who are not Broker-Dealers. Some of the BAM system transactions as disclosed herein and as are known to persons of skill in the industry (e.g., an AOT transfer as part of a loan sale), can involve Broker-Dealers as part of a tri-party agreement.

Figure 2:
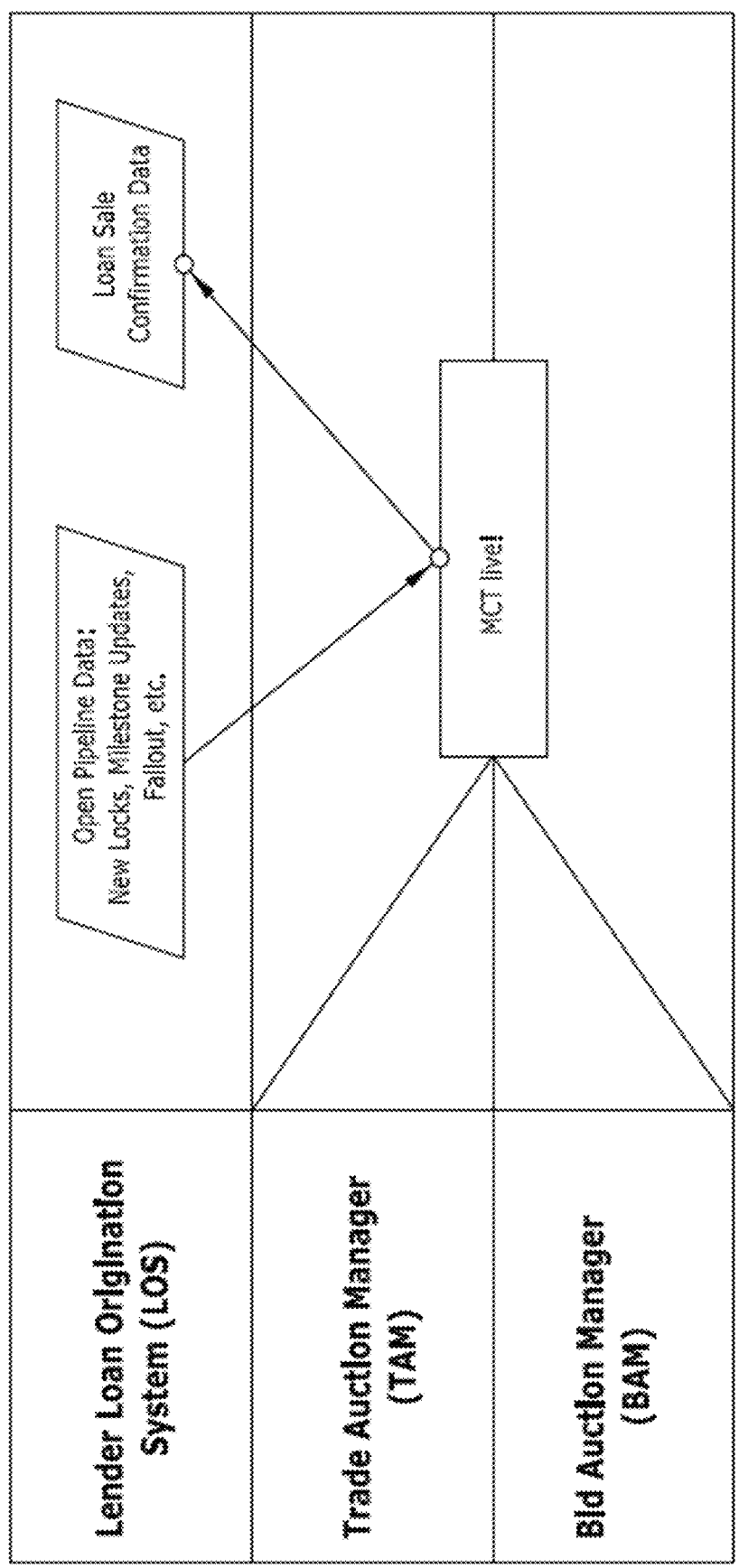
FIGS. 2-3 are flow charts illustrating one or more embodiments of the collaborative but independent modules of the computer system(s), platforms and associated methods of the instant disclosure.
Figure 3:
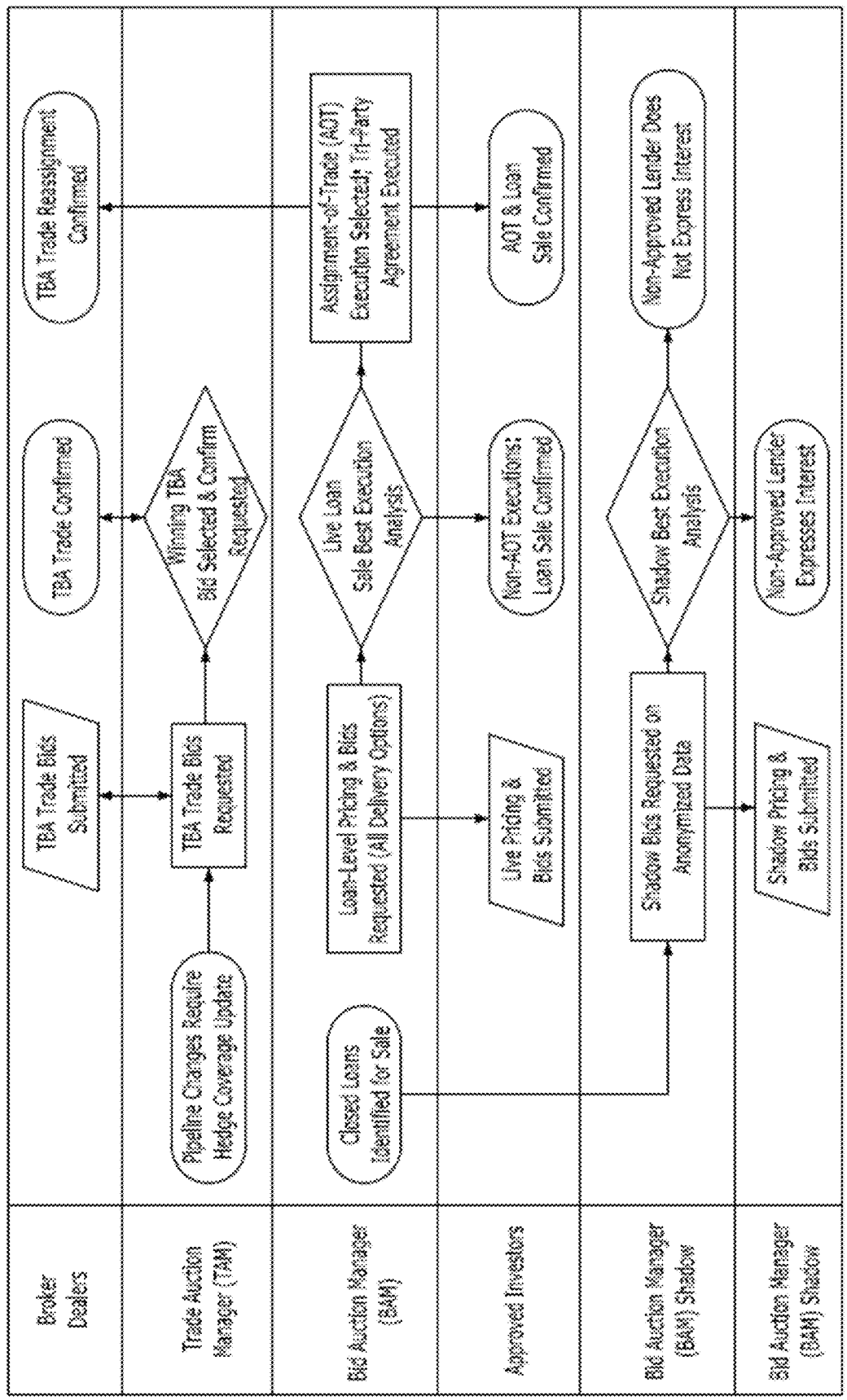

The overall interaction of these collaborative but independent platforms, systems and associated methods are also illustrated in FIGS. 2-3. FIGS. 2-3 illustrate the various functions, data and information flow, processes and decisions of the platforms, systems and associated methods for interacting with a Lender loan origination system and in transactions with various Investors.

Within the platform(s) of the disclosed computer system and associated methods, are multiple independent systems which can work collaboratively to facilitate the sale and/or assignment of loans by a Lender to one or more Investors using one or more Broker-Dealers, depending on the needs and intention of the Lender. By way of example, and without limiting the scope of this disclosure, a first embodiment of such an independent but collaborative system can be a system focused on the TBA market which can be incorporated into the platform as a system for managing bids in the AOT market between Lenders and Investors. Applicant presently identifies one or more embodiments of this system, platform and related methods as "Bid Auction Manager—AOT" (hereafter "BAM-AOT").

An embodiment of another independent but collaborative system which, in certain embodiments can be used with the platform(s) of the disclosed computer system and associated methods in a system for managing and executing trades between the Lender and one or more Broker-Dealers. Applicant presently identifies such a system as "Trade Auction Manager" (hereafter "TAM"). Other and additional embodiments are contemplated herein and only limited by the scope of the disclosure.

Preferably, one or more embodiments of each of the computer systems, platforms and associated methods of the present disclosure include one or more APIs or equivalent data transfer components loaded on the system of the Investors and the Broker-Dealers who participate in bidding on loans, AOT and/or TBA offerings though the BAM, BAM-AOT and/or the TAM platform system components. These APIs create efficiencies as to the operation of the computer systems, platforms and the applications of the associated methods. It also enables the systems to share data confidentially and in real time.

Bid Auction Manager.

One embodiment of a computer system and associated methods is referred to by applicant as Bid Auction Manager ("BAM"). BAM is an Internet based interface that enables mortgage Lenders ("Lenders") to securely submit and deliver bid tapes of mortgage loans available for sale to mortgage investors who purchase mortgage loans from Lenders ("Investor(s)"). In order for an Investor to complete a transaction in BAM with a Lender to transfer a loan, the Investor must first have an executed Loan Purchase and Sale Agreement in place between the Investor and the Lender. Investors with such Loan Purchase and Sale Agreements are deemed to be "Qualified Investors" who have completed and maintain appropriate due diligence and oversight on the Lender as a qualified counterparty. Investors who are not Qualified Investors but who wish to provide bids on loans are able to do so in the BAM system, platform module and related methods as discussed below in connection with shadow bids and Security Spread loan commitment locks.

Participating Investors may securely offer price and other terms to Lenders on specific loans contained in individual Lender bid tapes for such Lender(s) to accept or decline within the terms and provisions established by the Investor. Acceptance of such offers together with delivery of documentation between Lender and Investor generally occurs within BAM or through established communication channels between Lender and Investor.

Each bid tape contains enough loan identification and characteristics that enable an Investor to make an offer on the basis that each loan meets the underwriting, documentation, and other established requirements to be eligible for purchase by a Lender. With the increasing importance being placed on the protection and limitation on the dissemination of private information as well as information that is personally identifiable to of a person, embodiments of the computer system and methods associated therewith utilize one or more forms of encryption of the information. Embodiments can utilize public or private encryption and encryption keys as is understood by one of skill in the art. Embodiments are provided where the data is encrypted only on the move, and/or data at rest, or a combination of such encryption activities. Data encrypted on the move is data that is encrypted while in transit, while data which is encrypted at rest is always encrypted including while stored in a data repository of volatile and/or non-volatile (or permanent) memory.

Until BAM was created, transactions were typically handled between individual participants through secure email, phone, facsimile or even physical delivery. Consequently, the lack of an efficient and transparent support system resulted in higher operating costs and pressure for higher margins among market participants.

Bid Auction Manager—AOT.

One embodiment of a computer system and associated methods is referred to by applicant as Bid Auction Manager-Assignment of Trade ("BAM-AOT"). BAM-AOT is an Internet based tool that enables authorized Investor users of BAM to securely obtain bid tapes of mortgage loans available for sale from select Lenders together with an Assignment of Trade ("AOT") from an acceptable Broker-Dealer counterparty ("Broker-Dealer").

The Assignment of Trade(s) transaction in the TBA market has traditionally been a manual and paper-based process involving forms, creation of PDFs, and the necessity of a variety of forms of communications via email, fax and telephone. The data requirements of the tri-party process and the lack of a standardized process coupled with high volumes of individual transactions has made it difficult to track, log, and archive all elements of the assignment of trade process. This, in turn, increases operational risk and impacts transaction costs. In addition, the process has delays that can run into days, which can be adverse to one or more parties in a volatile market such as the secondary loan market. It also negatively impacts the costs to the Lender who cannot release the hedge on the loans being sold until the transaction actually closes, often days after the terms of the transaction are agreed upon by the parties. Consequently, the lack of an efficient and transparent support system resulted in higher operating costs and pressure for higher margins among market participants.

Key features of one or more embodiments of the BAM-AOT process modules enable the concurrent execution and transmission of a completed tri-party agreement at the time of the loan sale commitment. This passes the risks and rewards of the transaction to the Buyer/Investor without delay. This also enables the Lender to remove its hedge related to such loans in real time to reduce its costs and avoid any intervening market variations or volatility. Importantly, the system, platform and associated methods combine the granularity of price available via bid tape with the cash benefits of assigning the trade, which have historically been mutually exclusive.

The BAM module platform component has a 2-way integration into the loan origination system ("LOS") of the Lender. This enables the Lender to easily use one or more embodiments of the BAM or BAM AOT module platform component to sell or trade loans, including direct sale of loans or on an AOT basis with interested Investors.

Looking at the interface for one or more embodiments of the BAM Module platform, in order to begin a loan transaction with Investors, the Lender will utilize a button to upload loan numbers for which the Lender is intending to seek Investor bids.

Upon completion of the steps necessary to seek bids from Investors, each of the identified loans will be offered to Investors for purposes of purchase in the secondary mortgage.

In one or more embodiments of the systems disclosed herein, a Lender checks to make sure that the selected loans are eligible for transfer either directly or as part of an AOT transferor otherwise. Once a Lender has selected all of the loans and intends to offer for purposes of Investor bidding, and confirms that those loans are eligible, in one or more embodiments the loans can be aggregated into the bid auction manager of the disclosed computer system and methods associated therewith for purposes of soliciting bids from Investors in the secondary mortgage market.

In one or more embodiments of the systems, platforms modules and methods of the present disclosure, the Lender is allowed to vary the period during which bids will be accepted from each particular Investor identified by the Lender. The periods can be set to a common time frame or individually adjusted to different time frames for particular Investors. Thus, in one or more embodiments the Lender can set the exact time by which an Investor must submit a bid in order to be considered by the Lender.

Figure 7:
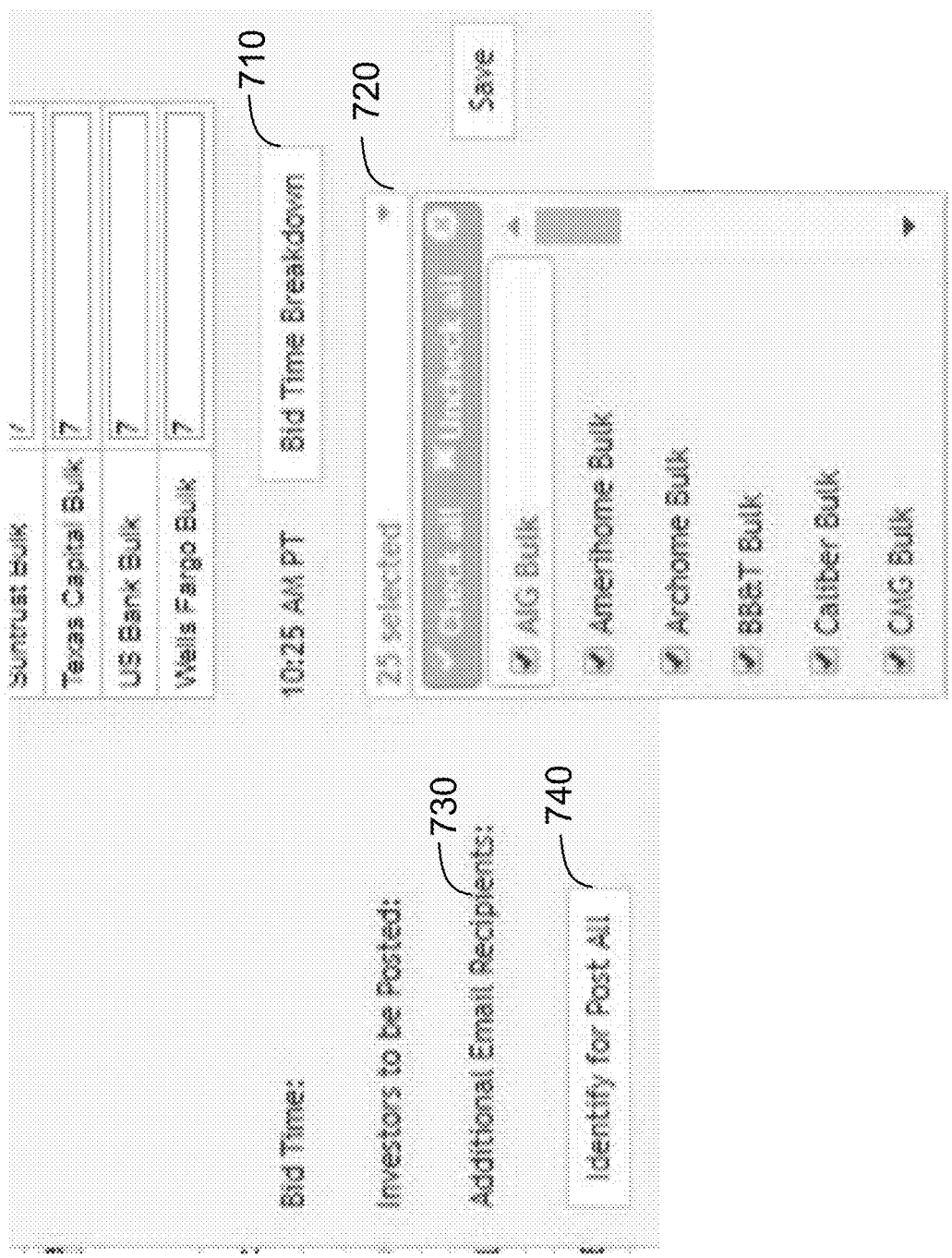

FIG. 7 depicts how in one or more embodiments the computer system, platform-modules and related methods associated therewith allow the Lender to identify Investors it would like to not have access to loans for bidding purposes. Thus, if a Lender has an independent relationship or other reason to not include one or more Investors in an offer of one or more loans within the Lender's portfolio, the computer system, platform and associated methods of the present disclosure enables the Lender selectively exclude particular Investors from receipt of the loans available for bidding.

Once the Lender has finalized the particulars for soliciting bids in one or more embodiments of the computer system platform modules and associated methods of the present disclosure from identified and chosen Lenders, the system platform modules and associated methods of the present disclosure allows the comprehensive posting of the loans for solicitation of bids by Lenders. After posting in one or more disclosed embodiments, Investors will begin posting bids in response to the offer posted by the Lender.

As illustrated in FIG. 8, the computer system and associated methods of one or more embodiments of the present disclosure will provide identification of activities by Investors on an individualized basis, including, for example, the specific time stamp for the posting of the bid, when the information was downloaded by the Investor, and when the Investor uploaded a bid for the loan at issue. Once the bid tapes are finalized in one or more embodiments, the Lender can then ensure that all of the bids received are eligible for immediate loan transfers As disclosed above, for example, in order to be eligible, the Lender and the particular Investor must have signed an investment agreement setting any specific terms, and all general terms, associated with the purchase, sale and transfer of loans between the Lender and the Investor. As discussed below, bids from Investors who are not Qualified Investors can also be accepted by the BAM platform module and related methods either as a shadow bid or as a Security Spread loan commitment lock bid.

Once the Investor is prepared to commit in one or more embodiments to the sale of loans based on received bids, the Lender utilizes the commit button of the computer system and platform modules and associated methods described herein. The computerized system and platforms, and the methods associated therewith, of the present disclosure enable the Lender to evaluate and change who the Lender prefers to commit to, on a loan by loan basis. For example, as shown in FIG. 9, this can be accomplished in one or more embodiments through a pop-up window in which information is displayed to the Lender and the Lender is allowed to determine which Investor will receive which loans. The computer system and methods associated therewith in one or more embodiments of the present disclosure also permit for the sorting of loans by each Investor so that the Lender can evaluate, on an Investor by Investor basis, as well as on a multiple Investor basis, what loan bids that have been received from various Investors. This enables the Lender in one or more embodiments of the computer system and associated methods to facilitate Lender policies or preferences of with regard to one or more Investors. Upon concluding which of the Investors with which the Lender wishes to proceed, the Lender can then request commitments from all of the successful Investors though the computer systems platforms and methods associated therewith described herein.

In one or more embodiments of the computer system and methods associated therewith a Lender is able to request commitments from all Investors once the Lender has utilized the steps from the computer system and associated methods described herein to identify the appropriate Investors from whom the Lender wishes to solicit a bid on particular loans within the portfolio. The Lender solicitation of bids from the Investor can be the same for all loans in the portfolio or can be varied on a loan by loan and Investor by Investor basis. In one or more embodiments of the computer system and methods associated therewith, to the extent the Lender does not wish to seek a commitment from a particular Investor and/or on a particular loan after bids are received, one or more embodiments of the computer system and methods associated therewith of the present disclosure allow for the Lender to deselect any Investor the Lender is not prepared to commit to sell one or more loans to, notwithstanding the fact that the bid had been received from that Investor on those loans. By way of example, one embodiment of the computer system and methods associated therewith allows the Lender to deselect one or more Investors before soliciting commitments from the remaining Investors on the remaining loans.

Where the loan transfer will include an AOT rather than a direct transfer standing alone, the computer system platforms and methods associated therewith of the present disclosure can, in one or more embodiments provide a listing to the Lender for all assignment of trade transactions with approved AOT instrument Investors. In at least one embodiment of the computer system platforms and the associated methods disclosed herein, the assignment of trades to an approved instrument Investor can be accomplished by, for example, the steps disclosed herein. Thus, as illustrated in FIG. 10, in one embodiment of the BAM platform component of the disclosed computer system and associated methods, the platform will identify for the Investor, AOT trades that match the loan slots identified by an Investor that it wishes to purchase.

One or more disclosed embodiments of the computer system platform modules and associated methods which can make assignments of instrument trades to an approved instrument Investor, one Investor at a time. In a first set of embodiments of the disclosed computer system and associated methods, for a selected Investor, the system will identify loans that match Investor requests based on, for example, coupon and security. The Lender can choose to assign the identified loans to that instrument Investor, including a partial assignment of a loan amount as part of a transfer by adjusting the amount of the loan from the full amount to the partial amount being assigned as part of the transfer. Additionally, the assignment can be an over assignment or a partial assignment, and thus the systems platforms and associated methods of one or more embodiments allow for the Lender to adjust the size of the assignment where only a partial assignment of an AOT is implemented. The pricing for such partial assignment is done on a pro-rata basis.

In certain other embodiments, the BAM-AOT module platform system and related methods can be used by selecting the BAM-AOT button, and the assignment selection and confirm buttons that are provided in such embodiments, and an assignment will be completed to any particular Investor. The Lender can repeat this process for each approved Investor until the entire portfolio of instrument transfers held offered out by the Lender for bids has been exhausted, or until the Lender determines not to make any additional assignment, in whole or in part as part of any instrument transfers based on the bids received.

As illustrated in FIG. 11, the computer system and associated methods disclosed herein include an embodiment in which loans are identified as representing the best execution for the Lender based on their portfolio by the computer system and methods disclosed herein. One or more embodiments of the present system, platform and associated methods of the present disclosure allow for a Lender to remove the hedge on a loan being sold after the Lender communicates an acceptance of the bid from the buyer but before the buyer confirms the purchase. When that occurs, a loan hedge can be removed from the loan at issue and the loan can be removed from the Best Ex analysis prior to receiving Investor confirmation of an assignment. In one or more embodiments of the computer-assisted systems, platforms and associated methods, this modification by the Lender can be implemented as illustrated in the above Figures.

Figure 12:
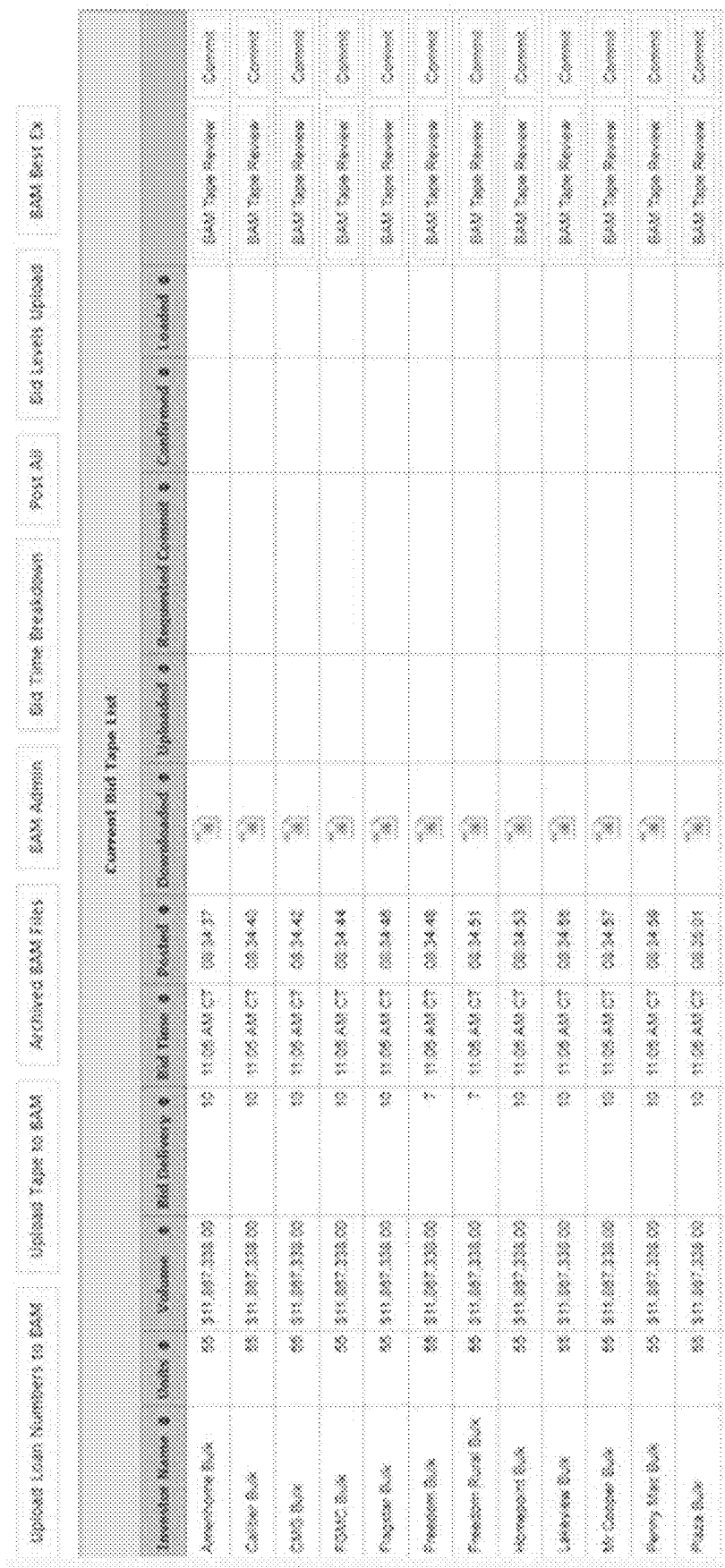

Another review of at least one embodiment of the computer system platform modules and associated methods of the present disclosure, the Bid Auction Manager computer system and associated methods which in some embodiments resides within the platform of the disclosed computer system and associated methods, such as, by way of example, MCTLive!®, is also presented. The execution of the BAM platform systems and associated methods is also illustrated by the disclosure herein for one or more embodiments of the BAM system platform module component and the related methods of the present disclosure FIGS. 12-13.

Like above, getting started with the BAM platform systems and associated methods is easy with one or more options for connecting to the computer system. These options include, but are not limited to, using two-way integration between one or more embodiments of the BAM platform systems and associated methods of the present disclosure which facilitates the exporting and uploading of data directly from the Lender LOS (Loan Origination System) via an API or via an SFTP connection.

Once in the BAM platform, the user is ready to generate a bid tape in the BAM system platform module, identify the instruments for sale, trade or assignment (e.g., loans a Lender wishes to sell, trade or assign, but this could be data for other instruments as disclosed herein and/or as known to one of skill in the art) to an Investor, review the bid tape details, specify bid timing, select Qualified Investors to include and add any non-qualified Investor recipients you would like copied on notifications. Turning to the Figures, and using the example of a Lender selling loans into the secondary mortgage market, the information about the loans for sale is loaded into one or more embodiments of the computer system.

In one embodiment, the computer system, platforms and associated methods of the present disclosure uses an "upload loan numbers to BAM" button, which opens a window into which loan numbers can be identified, and then includes another button for "aggregate BAM tape review." One or more embodiments can also include a window from which the Lender can review the bid tape details and/or a window in which the deadline for bids to be submitted by Investors.

Embodiments include a computer system, platforms, modules and associated methods of the present disclosure where by the Lender can review the list of Investors who can receive the bid tape, and where one or of the Investors identified for receipt of the bid tape by the computer system and associated methods can be removed and/or where an additional Investor can be added.

With a bid tape set, the Lender using one or more embodiments of the computer system, platforms and associated methods of the present disclosure can post to Investors and collect their bids. In one or more embodiments of the computer system and associated methods of the present disclosure, the Lender can use one-click to post the tapes to all Investors that were selected and sends them an email notification that they have tapes ready for bid in BAM.

Figure 13:
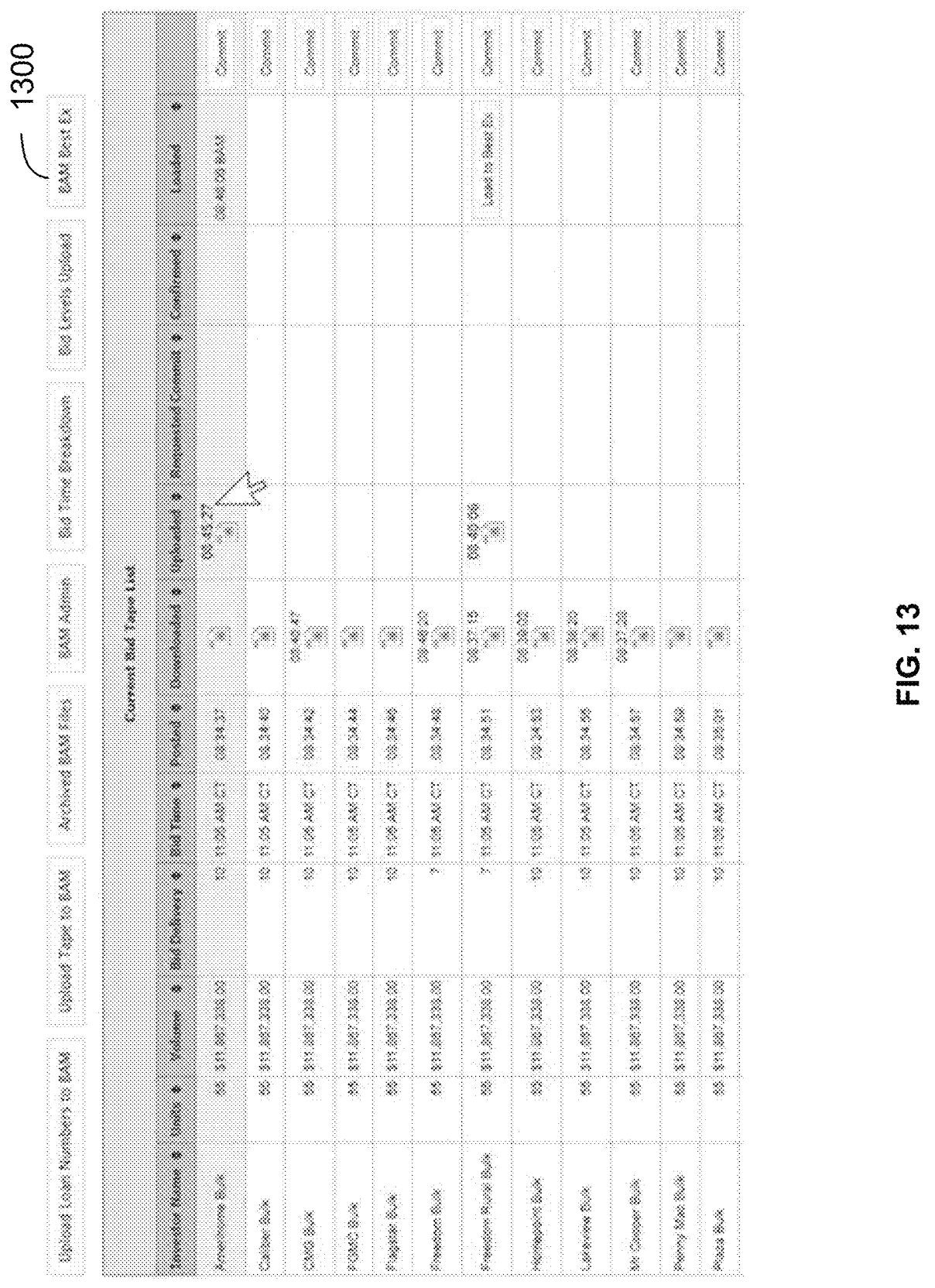

One or more embodiments of the computer system, platforms and associated methods of the present disclosure can include a window where live timestamps indicate when tapes have been downloaded (FIG. 12) and pricing has been uploaded (FIG. 13).

The user of one or more embodiments of the system, platform and associated methods of the present disclosure can also utilize the Best Execution module of the system, platform and associated methods to run a Best Ex analysis and commit to Investors.

Continuing with the example of a Lender selling loans into the secondary mortgage market, without prejudice to other uses of the embodiments of the computer system, platforms, modules and associated methods disclosed herein, when the Lender has pricing from all Investors ready, one or more embodiments of the computer platform, system and associated methods allows the Lender to run a Best Execution analysis. Thus, one or more embodiments of the computer system, platform and associated methods can include a button for the user to select a Best Execution analysis of the disclosed computer system and methods identified as "BAM Best Ex."

One or more embodiments of the computer system and associated methods of the present disclosure can include a screen where the leading bids based on the Best Execution Analysis are displayed such that the Lender can select Investors for commitment at the loan level before posting a commitment request to winning Investors. The Lender can also reduce the number of Investors from whom to seek confirmations by any amount, or proceed with no changes at all, depending on the circumstances and the instruments being sold, traded or assigned.

The Lender then transmits commitment requests to the selected Investors. As disclosed herein, embodiments of the computer system and associated methods will concurrently transmit the tri-party agreement previously discussed above to any party who has not accepted the tri-party agreement at this time. Most typically, but not necessarily, the Investor has not yet accepted a tri-party agreement for the assignment, but the Lender and the Broker-Dealer have accepted the agreement. In one or more embodiments of the computer system and associated methods, the Investor electronically executes the tri-party agreement when it provides its commitment confirmation to the Lender. This results in an immediate transfer of the assigned instrument to the Investor. This structure and method of the computer system platforms and associated methods provides significant efficiency heretofore unavailable to persons on the secondary mortgage market, removes human error and greatly speeds up the completion of the transaction for the benefit of all parties. The secondary mortgage market is subject to intra-day as well as inter-day volatility and the ability to immediately complete a transfer allows all parties the ability to determine how best to address that volatility (through hedging or otherwise) in the instrument(s) which are the subject of the sale, trade, exchange or assignment. The presence of human errors, or errors of any type, can be disastrous as it may result in a party not engaging in a hedge where it would otherwise have to do so, or vice versa.

Additionally, one or more embodiments of the computer system, platform and associated methods of the present disclosure provides a window where Investor confirmations are posted back from Investors and these confirmation can, in certain embodiments, be automatically written back into the Lender LOS.

Trade Auction Manager

One or more embodiments of a computer trading system(s), platform(s) and associated methods of the present disclosure is referred to in the market as the Trade Auction Manager ("TAM") system platform module component. The TAM module is an Internet based module that enables qualified mortgage Lenders ("Lenders") to securely request and execute commitments for "To-Be-Announced" ("TBA") agency-issued or agency-guaranteed residential mortgage-backed securities ("RIBS") from qualified and duly licensed Broker-Dealers. Advantageously, one or more embodiments of the computer system and associated methods disclosed herein include the ability to solicit competitive bids from multiple Broker-Dealers for transactions associated with AOT assignments of loans. Alternatively, one or more embodiments of the computer system and associated methods allows for the Lender in a single Broker-Dealer to set the terms for one or more mortgage sale transactions, which may include one or more AOT trades, TBA transactions and/or other trades.

The Trade Auction Manager (TAM) system and module allows small to midsize Lenders to send their TBA bids to regional Broker-Dealers electronically instead of verbally over the phone. This removes human transcription errors but more importantly allows for competitive TBA bidding among a large number of regional Broker-Dealers which was previously not possible. TAM electronically replicates the four communications between the Lender and Broker-Dealer that were historically only done verbally, namely: 1) the Lender submits a proposed trade for a bid level, 2) the Broker-Dealer posts a bid level for the submitted TBA trade, 3) the Lender requests a confirmation of the bid, and 4) the Broker-Dealer confirms the bid and the transaction closes.

To conduct trades in the TAM system module, the Lender must be a currently acceptable counterparty to the participating Broker-Dealer agreement and the participating Broker-Dealer must be an acceptable counterparty to the participating Lender. Participating Broker-Dealers may securely bid or offer TBA MBS pricing meeting all the required parameters of the TBA trade, namely: Security (issuer and maturity), coupon, face value (or par amount) and the settlement date.

All trades on the TAM module are conducted pursuant to the "Good-Delivery Guidelines" established by the Securities Industry Financial Markets Association (SIFMA) and set forth in the "Uniform Practices for the Clearance and Settlement of Mortgage-Backed Securities and Other Related Securities". Acceptance of bids and offers occur through the TAM system module or an alternative secure media acceptable to Lender and the Broker-Dealer. Settlement of TBA trades (e.g. by delivery of the loans) currently occurs directly between the Lender and the Broker-Dealer outside of the TAM platform or module.

Lenders seeking to execute TBA trades are provided with a simplified bid auction platform to expose their requests for offers or bids of TBA securities from qualified Broker-Dealers who are acceptable counterparties to the Lender as well for the Lender to be an acceptable counterparty to the Broker-Dealer.

Until the TAM platform and BAM modules were created, transactions were only handled between disparate individual participants through secure email, phone, or facsimile. Consequently, the lack of an efficient and transparent support system resulted in higher operating costs and pressure for higher margins among market participants.

Figure 14:
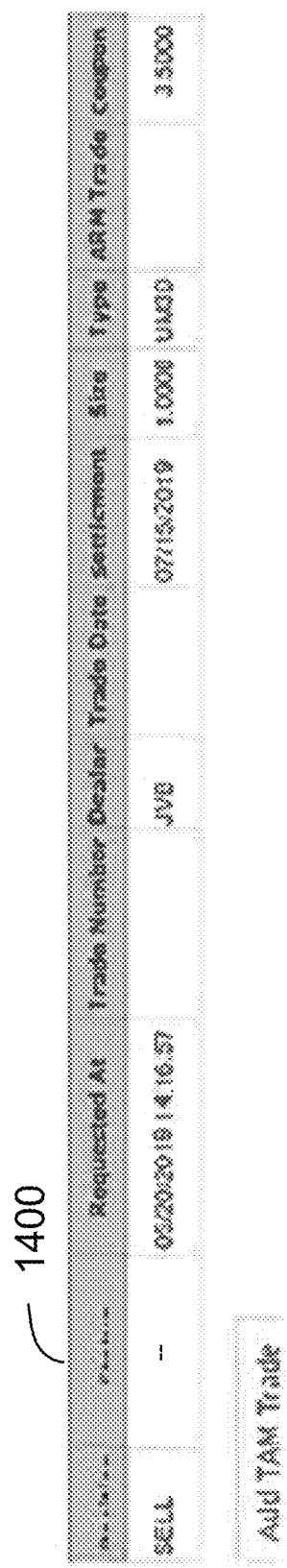
FIGS. 14 and 15 are illustrative screen shots showing how a user can use one or more embodiments of the computer system(s), platforms and associated methods of the instant disclosure in the TAM module to conduct a trade of one or more securities as illustrated regarding a TBA mortgage loan sale to a Broker-Dealer in the secondary loan market including where a Best Ex analysis is employed.
Figure 15:
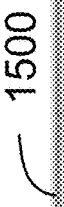

Embodiments of the computer system and associated methods disclosed herein are illustrated in one or more FIGS. 14-15. By way of example and without limiting the disclosure or the embodiments disclosed herein, using the TAM element and/or module of one or more embodiments of disclosed computer systems and associated methods, Lender can select a single or multiple Broker-Dealers through which the Lender can accomplish the transaction contemplated by the Lender. In one or more embodiments of the disclosed computer system platforms and methods associated therewith, the system can identify for the Lender which Broker-Dealers existing terms reflect a Best Execution strategy for one or more of the transactions contemplated.

By way of example, once a Lender enters information about the loan or loans that are the subject of the contemplated transaction into the computer system, and submits the proposed trades to the mortgage Dealer the computer system will facilitate the communication with the Broker-Dealer so that the Broker-Dealer can submit a bid or price, together with any corresponding fees charged by the Broker-Dealer, for the associated transaction. As disclosed above, the Lender can set time deadlines for responsive price quotes and/or bids from a Broker-Dealer in one or more embodiments of the computer system and the associated methods disclosed herein.

Once the Lender has received a response from one or more Broker-Dealers, the Lender can then accept or reject one or more of the proposals submitted by the Broker-Dealer for the loan transaction contemplated by the Lender which can include, the direct assignment of one or more loans and/or the assignment of trades associated with one or more loans, or combination of any of the foregoing in various embodiments of the computer system and associated methods. In at least one embodiment of the computer system and associated methods, once a Lender accepts a proposal and the Broker-Dealer confirms the trade the information of the Broker-Dealer will be assigned to the loan and/or the AOT for any future transaction, as illustrated, for example, in FIG. 15.

The market also seeks specialized features and functionality relating to one or more securities that is the subject of a trade or sale. These specialized features and functionality can be based on the need for particular data to be determined and made available to the buyer which is not otherwise available. For example, Lenders may be able to maximize the sale price of a security, such as a pool of loans, if it can provide the bidders with detailed information from various sources about the loans in the pool. Such data has been impossible to provide absent the systems, platforms and associated methods of the present disclosure. One such specialized feature and functionality is provided by one or more embodiments of the TAM module platform component, and the systems, platforms, and related methods and is referred to herein as TAM platform module securitization.

Using the TAM system platform module for a TAM Securitization, a Lender can use the TAM system platform module and associated methods disclosed herein to offer a pool of loans to Broker-Dealers which meet certain thresholds or characteristics for specialized, and typically higher priced, treatment by the market. For loans that will become part of mortgage backed security, one of the considerations that impact pricing of the loan is the risk of early repayment of the loan. Thus, buyers will pay a premium for loans with a lower risk of early repayment by the borrower. Examples of such loans include loans with lower principal amounts and loans to borrowers whose credit scores meet the level required by a particular buyer but are not in the top tier of credit scores. Borrowers with smaller loan balances are typically less likely to refinance their loan for small changes in interest rates as the time for such a borrower to recover the fixed costs associated with a refinance (appraisal fees, title costs, etc.) is long enough to make the refinance not viable or worth the time and effort the borrower needs to expend to accomplish a refinance.

Using the TAM system platform module securitization feature, the Lender can offer pools of loans where the TAM platform system module will retrieve the information about the loans and the borrowers on a granular level and group the loans to meet the preference of a buyer so that the Broker Dealer purchase loans pooled in a way that meets the special requirements set by the buyer to qualify for a higher price associated with such a specialized pool of loans. The TAM system, platform module, and the associated methods, are able to amalgamate the data from the Lender's LOS data, from third party websites (e.g., for census data) and from the MCTLive!® master platform system. This level of data accessibility to buyers is not possible prior to the systems, platforms and associated methods of the instant disclosure due to the lack of availability of the data, the constraints of the market and the available time associated with the sales of loans in the marketplace.

An additional example of the unique benefits of the systems, platforms and associated methods of the instant disclosure is the ability to provide loan level detail for the pools and providing more granularity from on a pool level to increase the price for the pool. For example, assume a Lender has a $2.45 million dollar pool with a jumbo loan and that is a spec 110 with four coupons. The computer systems, platforms and associated methods will allow the buyer to set the trade for a specified settle date, for example it could be set for a date chosen by the Lender. The systems, platforms and associated methods of the instant disclosure can access to the internal pool number for tracking purposes and provide the Lender the ability to do a trade outright or to trade it on a swap.

Yet another example can be to meet the requirements of the party (such as Ginnie Mae) to create a pool of loans that meet thresholds or standards set by the party for specialized pools. For example, Ginnie Mae will pay a premium for loan pools where the loans are to borrowers whose income is at specified percentages of the median area income for the applicable census area. The TAM system, platform and associated methods allow the Lender and Broker Dealer to identify such loans and provide the Broker Dealer and others with the supporting data to qualify such loan pool as meeting the specialized requirements and the increased pricing associated therewith. This ability to group available loans in real time by loan characteristics and/or borrower characteristics, was not feasible or possible prior to the present systems, platforms and associated methods of the present disclosure.

The CUSP (Credit Underlying Securities Pricing) or the MIP (mortgage insurance premium) for a Ginnie Mae loan would be the major code but there is also an ability to include any comments on pool details for the pool. The computer system can include various pool details in real time from calculations based on the bid tape upload and other information from third party sources.

As the embodiments of the computer systems and methods associated therewith of the current disclosure relate to the secondary mortgage market, including but not limited to, the AOT and/or TBA markets, the computer system and methods associated therewith contain proprietary unique computer system and methods associated therewith that bring, among other benefits, the rigor of risk management disciplines and analytics to multiple distinct market elements. Thus, for example, Assignments of Trade ("AOT") and the execution of trades in the To-Be-Announced ("TBA") market. Until the platforms of the embodiments of the computer systems, platforms, modules and associated methods of the present disclosure were created, transactions were only handled between individual participants through secure email, phone, facsimile or even physical delivery. Consequently, the lack of an efficient and transparent support system for these esoteric market segments resulted in higher operating costs and pressure for higher margins among market participants. They also lacked the safeguards included in the disclosed computer system and associated methods for the protection of data and/or personally identifiable information. Likewise, there was no ability for the Lender to obtain a best execution strategy of the type of embodiments of the computer system and associated methods provide. Likewise, it was not possible to obtain an immediate transfer of the instruments being sold, together with the corresponding risk of market changes to the buyer, in real time at the time of a transaction.

The master database of the system and platform of the present disclosure (e.g., MCTLive!®) contains access to various types of information applicable to managing interest rate risks on mortgage loans. As discussed above, these trades can be made through the BAM system, platform module and associated methods to an Investor through a direct bid-tape sale and/or through an assignment of trades in the TBA market (with the cooperation of the Broker-Dealer) and by the Lender to a Broker-Dealer using the TAM system, platform module and associated methods through a TBA transfer and/or through a TAM platform system securitization, each as discuss above. In addition, the master database of the system and platform of the present disclosure preferably includes providing Lenders with access to a hedge platform used by Lenders in order to protect against volatility in the price of a committed loan lock to a borrower or a loan held for sale in the secondary mortgage loan market as described herein.

Hedging

Figure 16:
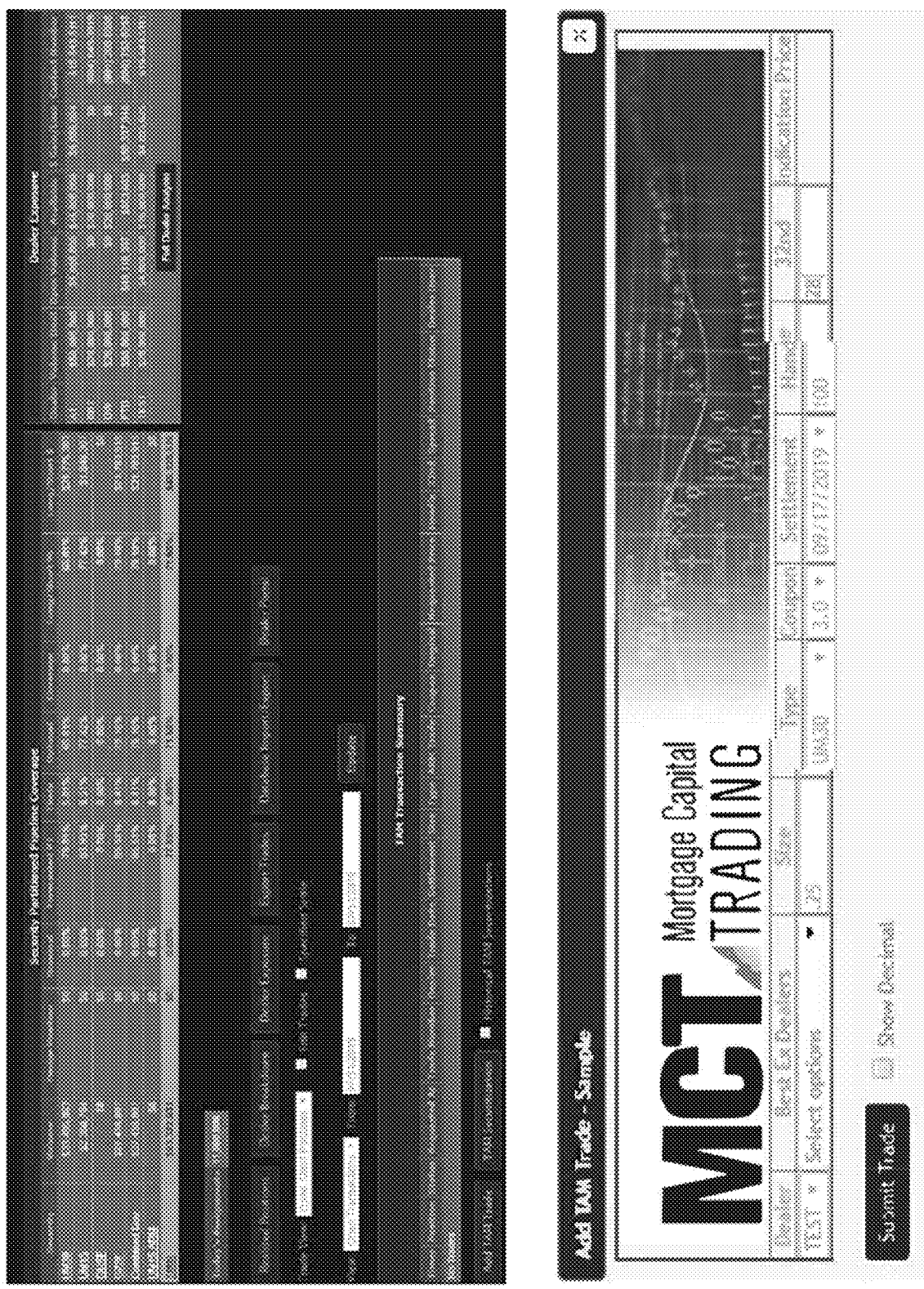
FIG. 16 reflects one or more embodiments of the Best Execution module of the computer system(s), platforms and associated methods of the instant disclosure.

As is well known in the industry, hedging is done by participants in the secondary mortgage marketplace, and in other markets for the trading of financial instruments, to protect against value loss due to rate/price volatility in the market place. The disclosed computer systems and associated methods enable Lenders to hedge risk concurrently with the sale, assign and/or transfer of loans using the disclosed computer system and associated methods as illustrated in FIG. 16.

A TBA trade position is a common security used by mortgage Lenders when hedging their loan pipeline and committing loans to select correspondent Investors. Thus, liquidity in the TBA market provides a critical market function by enabling mortgage Lenders to price and hedge their origination pipelines. Trade settlements on TBA trades can be scheduled as far out as 3 months into the future. Thus, Lenders can lock-in the price for the mortgage loans that are undergoing the origination process for up to that period and still hedge the risk that interest rates and prices may change. In the context of TBA hedging, a pair off is the settling or buying back of a short position that was used as the loan hedge.

As is understood by one of skill in the industry, when a Lender has a long position on a loan (e.g. a sixty day loan rate lock commitment for a new Borrower), the Lender will pair that long position with a corresponding short position on a related security such as a TBA trade, i.e., a "hedge." This hedging or pairing of corresponding long and short positions for a loan enables the Lender to protect itself should the market for the long term loan commitment position change adversely to the Lender prior to the funding and sale of the loan by the Lender (e.g. interest rates rise relative to the locked rate for the loan at issue).

When interest rates increase, the value of the mortgage loan or loan commitment decreases. Similarly, the value of the TBA trade purchased by the Lender as a hedge also decreases. But, since the TBA trade was shorted/sold by the Lender, the Lender buys back the TBA trade at a discount to what they originally sold it for.—"Buy Low and Sell High" (the Lender may lose on the loan sale but gain on the hedge). When interest rates decrease, the value of the mortgage loan increases. Similarly, the value of the TBA trade increases. But, like above, since the TBA trade was shorted/sold by the Lender as the hedge, the Lender buys back the TBA trade at a premium to what they originally sold it for. —"Sold Low—Buy High" (the Lender may lose on the hedge, but gain on loan sale). As is clear from the above, when a Lender sells a loan and pairs off its hedge, it seeks to maximize the value of the overall transaction, which includes both the price received for the loan and the costs of the trade (which includes the costs of pairing off the hedge).

Thus, as illustrated in FIG. 16, the hedge module and platform, and related methods, of the instant disclosure, will evaluate the Lender's entire pipeline of locked loans to determine which, if any, require a hedge to protect the Lender from intervening market volatility. The system and related methods utilize data about the Lender's pipeline of loans (or applicable securities). The hedge model is a pull-through based/duration matching strategy. In one or more embodiments of the present system, platform and associated methods, the hedge platform targets a market neutral position rather than trying to time or guess market moves. Thus, the preferred hedging platform of one or more embodiments is revenue neutral and will position the user to capitalize on the spread offered by the Investors to whom the loans are offered. In addition, the hedge platform looks to mitigate adverse consequences of loan pull-through from changes in interest rates.

One or more embodiments of the computer system, platform and associated methods focus on using TBA positions, including TBA mortgage backed security positions, rather than individual buyer specific short positions to short the long risks associated with locked loans or locked loan commitments in the Lender's pipeline or portfolio. The hedge platform of one or more embodiments can look to obtain TBA coverage, or recycle coverage already in place if possible, or to buy back TBA positions from Broker-Dealers to provide an optimal coverage ratio, all in association with a regular review of the mark to market impact on the portfolio or pipeline.

The hedging execution process used by one or more embodiments of the hedge module utilizes, among other things, a pipeline breakdown of one or more modules of the system, platform and associated methods of the present disclosure employing one or more of the principles outlined above. The systems platforms and related methods of the present disclosure provide the Lender with a recommendation for placing the necessary hedge transactions on a Best Execution basis. Thus in one or more embodiments of the computer system and associated methods disclosed herein, the trading system platforms and modules and their related methods can track the elements of the bid-offer spread costs and may factor the avoidance of such costs into a best execution analysis for the Seller of the instrument (e.g., an AOT transaction), as described above in association with the TAM module platform and related methods. If additional hedging is required based on the model analytics or analysis for one or more loans in the pipeline, the Lender can also use the system, platform and associate methods to test various scenarios to optimize the hedge coverage. Still, the identification and matching of hedge positions through a hedge platform and any execution of a possible hedge position are accomplished by different systems and are overseen and typically operated by different individuals who manually oversee the processes.

Additionally, prior to the advent of the present systems, platform modules and related methods of the present disclosure, once the applicable Lender personnel receive a recommendation for a hedge transaction, that individual must contact a Broker-Dealer with whom the Lender has a relationship to determine the cost of a transaction that meets the hedge recommendation. The prior systems required this be done on a direct contact basis between the Lender and the Broker-Dealer, typically by encrypted email or more typically by telephone. Thus, any evaluation and/or recommendation about a possible hedge for new loans or new exposure to the Lender would only be sent to the operating group of a Broker-Dealer through an external system or over the telephone. To the extent the Lender wants to obtain even a limited number of competitive bids for the security that will be used to hedge the loan exposure of the Lender's portfolio (e.g., selling short a TBA trade), then the Lender must use personnel to contact each Broker-Dealer serially for quotes for the hedge security. This necessarily limits the ability for the Lender to obtain competitive bids as the time it takes for the Lender to serially contact multiple Broker-Dealers can exceed the time a quoted price for a hedge is valid given that the prices of such hedges (e.g., TBA's) fluctuate with market movements.

With the advent of the present systems, platforms and modules (such as the TAM platform module) and the related methods disclosed herein, the persons overseeing the purchase of the hedge security can now concurrently solicit bids from multiple Broker-Dealers to buy or sell a TBA trade using the trading platform of the TAM system module to enable the Lender to find the best opportunity to establish a hedge position from any of the Broker-Dealers with whom the Lender has an established trading relationship.

Thus, one of the advantages of the systems, platforms and associated methods of the present disclosure is the ability for the disparate persons who oversee selling or trading loan commitments and who are responsible for acquiring or placing hedges to minimize the market risks to the Lender based on loan commitments or funded loans which have not been sold to Investors in the secondary loan market, to use a single trading system to sell or trade loans with Investors, receive hedge recommendations and to interact with and execute trades with Broker-Dealers to place hedges to protect the Lender from market fluctuations. This marriage of previously separate systems and communication channels overcomes the historical practices of using separate and serial communications by multiple persons, often by telephone. This achieves significant new efficiencies for Lenders, safeguards the transactions from favoritism or lack of competitive bidding while also avoiding errors, mistakes and the opportunity for fraud or collusion of the prior independent systems and communication channels discussed above. Engaging in trades using the Trade Auction Manager platform system module with the system platform and related methods of the instant disclosure best protects the Lender from the adverse impacts of market volatility, provide true competitive bidding and minimizes the costs of loan hedging to the Lender.

In one or more embodiments of the system, trading platform and methods of the instant disclosure, the TAM system platform module is further arranged to interact directly with the system hedge platform. This allows these embodiments of the present system, platform and the related methods to execute on the hedge recommendations to the Lender based upon real-time information of the production (i.e. the various outstanding locked interest rate loan commitments from the Lender to individual Borrowers) in the Lender's pipeline and immediately match those loans with appropriate hedge positions available to the Lender for such production. One or more embodiments of the systems, platforms and associated methods of the present disclosure can additionally allow for the TAM platform module to execute the hedge recommendations of the hedge platform module and place the hedge without any intervention or input from a system operator.

Prior to the systems, platforms and associated methods of the present disclosure, it was not possible to execute hedge positions from a single system that provides real-time data to the hedge platform to permit the hedge platform to make real-time recommendations to the Lender for hedges required to protect the Lender's pipeline from market volatility or changes. Nor was it possible to release a hedge position previously used to hedge a loan which was sold by the Lender to an Investor using the BAM system platform module as described above based on real-time data. Likewise, prior to the systems, platforms and associated methods of the present disclosure, it was not possible to execute hedge positions without human intervention or oversight using a single system that provides real-time data to the hedge platform to permit the hedge platform to make real-time recommendations to the Lender for hedges required protecting the Lender's pipeline from market volatility or changes, or to release a hedge position based on real-time data and using true competitive bidding amongst all Broker-Dealers with whom the Lender has a trading relationship. Rather, under the prior systems, all of these decisions are necessarily delayed due to the segmentation of the functions. And no systems, platforms or methods were available to permit these disparate functions to be operated in real-time or to achieve better market efficiencies and the prospect of eliminating or reducing a portion of a Lender's operations and related expenses previously required to separately execute hedge transactions via limited competitive bidding.

In one or more embodiments of the trading system of the instant disclosure, the systems, platforms and associated methods of the instant disclosure are arranged in a way through the MCTLive!® master data platform system such that the user of the TAM platform module, or the TAM system platform itself, is able to obtain real-time notice of changes in the hedging requirements of the Lender's pipeline and then proceed to execute a trade to place the hedge required by the Lender's pipeline changes. Likewise, the user of the TAM system module, or in other embodiments the TAM system platform itself, is able to receive updated hedge recommendations and use that real-time information to execute a release or pairing-off of a hedge held by the Lender that is no longer required.

By way of example of the above, in one or more embodiments of the methods used by the systems, and the system platform modules of the instant disclosure, where the TAM platform system module is connected to the hedge position database of MCTLive!®, loan sales executed under the BAM system platform module and related methods as discussed above can be an event trigger within the TAM Platform for hedging. In these embodiments, the TAM module can execute hedge TBA trade positions based on real-time pipeline exposure thereby completing the final step in permitting the platform and the related methods of the overall system and related methods to provide a hedging position recommendation and execution of those recommendations on a Best Execution basis without oversight or input from a human.

As part of the evaluation of options for hedges available to the Lender, the TAM system platform module and related methods are able to evaluate various factors including the price, availability and costs associated with a particular hedge position to select the best bid/offer from competing Broker-Dealers on the TAM Module. Additionally, one or more embodiments of the TAM system platform module and related methods are able to apply any factors established by the Lender for executing a hedge. Such factors can include but are not limited to evaluation factors which include the price or cost of the hedge transaction and how the hedge might impact a margin call on the Lender. The TAM system platform module is also able to evaluate the best hedge choice after applying any relationship factors between the Lender and the seller of available hedge positions. For example, and without limitation, relationship factors might be a system of alternating the entity from which the Lender purchases a hedge for each transaction or every X number of transactions so as to spread the business around amongst a group of preferred Broker-Dealers with whom the Lender has a relationship. Other relationship factors might involve a tie between the Lender and one or more Broker-Dealers, wherein special pricing is provided if certain circumstances occur. These kinds of relationship factors can be changed as the Lender decides and can be executed faithfully by the TAM module in real-time and without oversight or any required intervention. This is not possible with the current systems, platforms and methods, other than with the systems, platforms, and methods of the various embodiments of the trading system of the present disclosure.

Thus, for example, one or more embodiments of the present systems, platforms and methods of the present disclosure are able to have the TAM platform system module component sell short positions available to the Lender (e.g., in a TBA transaction) to meet the real-time hedge requirements of the Lender's portfolio (or buy-back short positions held by the Lender but no longer required as a hedge as part of a sale of loans by the Lender), all at the best available price/cost and terms and while employing any evaluation factors or relationship factors, without any intervention or communication between the historically disparate platforms or communication channels that currently handle such transactions.

Accordingly, Lenders using one or more embodiments of the trading platform, systems, modules and their related methods of the current disclosure enables a Lender to go from end to end in a loan process using a single system through a series of transactions executed sequentially in real time. Thus, by way of example, using one or more embodiments of the trading platform, systems, modules and their related methods of the current disclosure, a Lender is able to make a loan commitment to a new Borrower for a specific loan for that new Borrower. The information regarding that loan commitment is, in real-time, provided to one or more embodiments of the present system, platforms and associated methods, so that the Lender can concurrently locate an appropriate hedge position associated with that commitment and evaluate whether market conditions are appropriate for engaging in that transaction which best satisfies the needs of the Lender or capitalizes on market conditions at any time from the time the Lender makes a loan commitment to the Borrower to the time the Lender sells the loan to an Investor, whether that be before or after the funding of the loan by the Lender.

As disclosed herein, the various embodiments of the systems, platforms and related methods of the present disclosure also create efficiencies in the operation of the prior systems, and the computer hardware on which the systems, platforms and associated methods are performed. The disclosed computer systems, platforms and associated methods allow for the burden on the overall system to be reduced, avoids the need for the user and the computers and Lender to support and/or look to disparate sources and locations for information. This also allows the systems, platforms and methods of the present disclosure to simultaneously provide unprecedented efficiencies, cost savings, profitability, information availability and data protection to the participants (e.g., the Lenders, Investors and Broker-Dealers) as disclosed herein. These systems, platforms and modules, and their related methods, makes obsolete the practices used by many lenders for decades of making serial telephone calls or communications with Investors and Broker-Dealers. Instead, they provide a robust and highly efficient end to end system and process for obtaining true competitive bidding in a secure environment that maximizes the Lender's ability to minimize costs and maximize revenue from the sales of loans in the secondary loan market, all while applying Best Execution strategies and any Lender specific rules or factors associated with the Lender's business and relationships with Investors and Broker-Dealers. These same advantages would be applicable to the trading of other securities other than loans and TBA trades in the secondary loan market, and thus the examples provided herein are merely illustrative of the scope of the present disclosure and are not limiting of the claims.

Often, Investors also have related businesses that are in the loan origination business. It is undesirable to place Lender sensitive data in the bid tape in the hands of potential competitors who might, for example, use the data to attempt to refinance the loan they bid on but did not win. Thus, there is a need to protect the detailed information relating to loans being offered for sale in the secondary loan market from bidders who might also be a Lender who could seek to refinance the loan directly if they are an unsuccessful bidder for the loan in the market. One or more embodiments of the systems, platforms and associated methods provides for the protection of data at rest through, for example and without limitation, the geo-coding of data and/or the use of platform generated identification numbers for loan numbers, and similar protections that prevent an Investor from having the necessary information about the properties that are the subject of loans being offered for bid and highly valuable to the Lender and to the winning bidder. This protects the loans from being targeted by other Lenders for refinance based on information shared as part of the bid request processes. One of the ways one or more embodiments of the present disclosure accomplish that is to only disclose one or more of the full property details, address and/or full Borrower identification to the successful bidder for the loan. Thus, critical information about the properties that are the subject of the loan which is being transferred or sold by the Lender into the secondary mortgage market is shielded from all participants in the transaction other than the winning bidder for the purchase of the loan or assignment of the transaction. This is particularly important from the Lenders position for Lenders making Retained vs Released decision within the Best Ex analysis provided by one or more embodiments of the computer systems and associated methods of this disclosure.

For example, since a high percentage of secondary mortgage market transactions expose Borrower addresses to non-buying bidders and creates concerns regarding EPO (early pay off) and pre-payment speeds, the disclosed computer systems and methods associated therewith assigns one or more proprietary processes for encoding data at rest to safeguard that information. Thus, one or more embodiments geo-codes each property in real time in a manner which allows the Investor sufficient location information about the property to make a bid but without providing the particular address for the property to anyone other than the winning bidder.

In one or more embodiments of the systems, platforms and associated methods of the instant disclosure, geo-coding can rely on coding of government sponsored data, including but not limited to data from the website located, as of the filing date, at https://geomap.ffiec.gov/FFIECGeocMap/GeocodeMap1.aspx. Embodiments of the computer system and associated methods disclosed can use the data from the above address to engage in real time geo-coding of data rather than processing batch downloaded local data or other techniques. This allows for the computer systems and methods of the present disclosure to address new properties that have not been previously batch downloaded for coding or where a street address for a property has changed.

Additionally, embodiments of the computer systems and associated methods also provide further protection of sensitive information while the data is at rest rather than no protection or just while the data is in transit by, for example, public key encryption of emails between parties. One such method used by one or more embodiments is the proprietary geo-coding in real time of certain data used by one or more embodiments of the computer systems and associated methods of the present disclosure. This allows for only the winning bidder to have access to such encrypted data at rest, yet still providing sufficient information to the Investor to bid on the loan. An additional example is provided in one or more embodiments of the computer systems and associated methods where the Lender loan numbers are replaced with an encoded ID generated by the computer systems and associated methods before the loans are sent out to the Investors for bidding so that the Lender information is further protected at rest, and the actual data is only exposed to the winning bidder. Embodiments thus permit only the winning bidder on a loan to decode the geo-code of the property associated with a loan transaction Similarly, by way of example, embodiments of the computer systems associated methods use an encoding scheme to obscure Lender loan numbers from all Investors an only provide the actual loan number(s) to the winning Investor. This encoding can be done using a random number generator or by other known methods and retained for future trackability in the computer systems and associated methods disclosed.

This ability to protect private and/or personally identifiable information of a borrower or other person associated with a transaction addressed by the computer system and associated methods of the present disclosure is particularly important as the law and current industry practices limit the dissemination of personally identifiable information. In addition, these embodiments protect the loans from being targeted by other Lenders for refinance based on information shared as part of the bid request processes associated with one or more embodiments of the computer system and associated methods.

In addition, loans that meet the criteria of various regulatory or governing bodies, or of Investor corporate policies associated with certain types of loans (for example, but without limitation, loans associated with Low-Moderate Income ("LMI") and Community Reinvestment Act ("CRA") incentives) can be provided without the actual property address. This way, only the winning bidder receives the complete property address of the Borrower. This allows the Investor to be better protected from an EPO event and to more reliably use historical payoff rates in making investment decisions.

When requested commitment files are posted to one or more of the computer systems and associated methods of the present disclosure, for example and without limitation, to BAM, they will now contain 7 fields instead of the current single loan number field. Thus, the winning Investor will now receive two "Loan ID" fields: Seller's Loan ID and corresponding company (e.g., MCT) generated ID for bid tape mapping. In addition the winning bidder can receive, under one or more embodiments, five "Property Address" fields, namely the property street, city, county, state and zip code.

Shadow Bids.

Investors may also use BAM to provide bids on bid tapes from Lenders with whom the Investor may not have a current loan purchase and sale agreement. Shadow bidding may encourage those Lenders to consider entering into a loan purchase and sale agreement with the Investor and sell loans on an ongoing basis. "Shadow Bids" mean Bid Price Data from a non-qualified Investor submitted on BAM for Bid Tapes specific to an originator who is not currently approved to sell mortgage loans to such Investor. The Lender who has originated the loan(s) determines what Investors may be acceptable counterparties and execute mutually loan purchase and sale agreements with such Investors.

FIGS. 18-23 illustrate one or more embodiments, including preferred embodiments, of the methods associated with the computer system disclosed herein in schematic format.

As discussed above, in one or more preferred embodiments, the client is a Lender seeking to sell one or more loans or other financial instrument into the secondary market; the Investor is the entity seeking to purchase one or more loans or other financial instruments in the secondary markets. The Investor can include an individual Investor, a financial institution and/or a government sponsored enterprise ("GSE") such as FANNIE MAE. The seller is typically a Broker-Dealer.

Alternatively, the preferred embodiments are disclosed herein where a transaction may be an AOT of a TBA loan trade position which, as discussed above, is a common practice used by mortgage Lenders when hedging their loan pipeline and committing loans to select correspondent Investors. In the transactions of loans in the secondary mortgage market, the transactions always involve three parties (mortgage Lender, Broker/Dealer, and loan Investor) and is governed by a "tri-party" assignment document. Alternatively, in a typical AOT transaction, the assignor is the mortgage Lender and the assignee is the loan Investor. The Broker-Dealer is the owner/seller of the TBA position being assigned. In each of these scenarios, the Investor aggregates the mortgages purchased and sells them as a mortgage backed security ("MBS") to Investors such as pension funds, insurance companies and/or hedge funds.

System Data Flows

Figure 18:
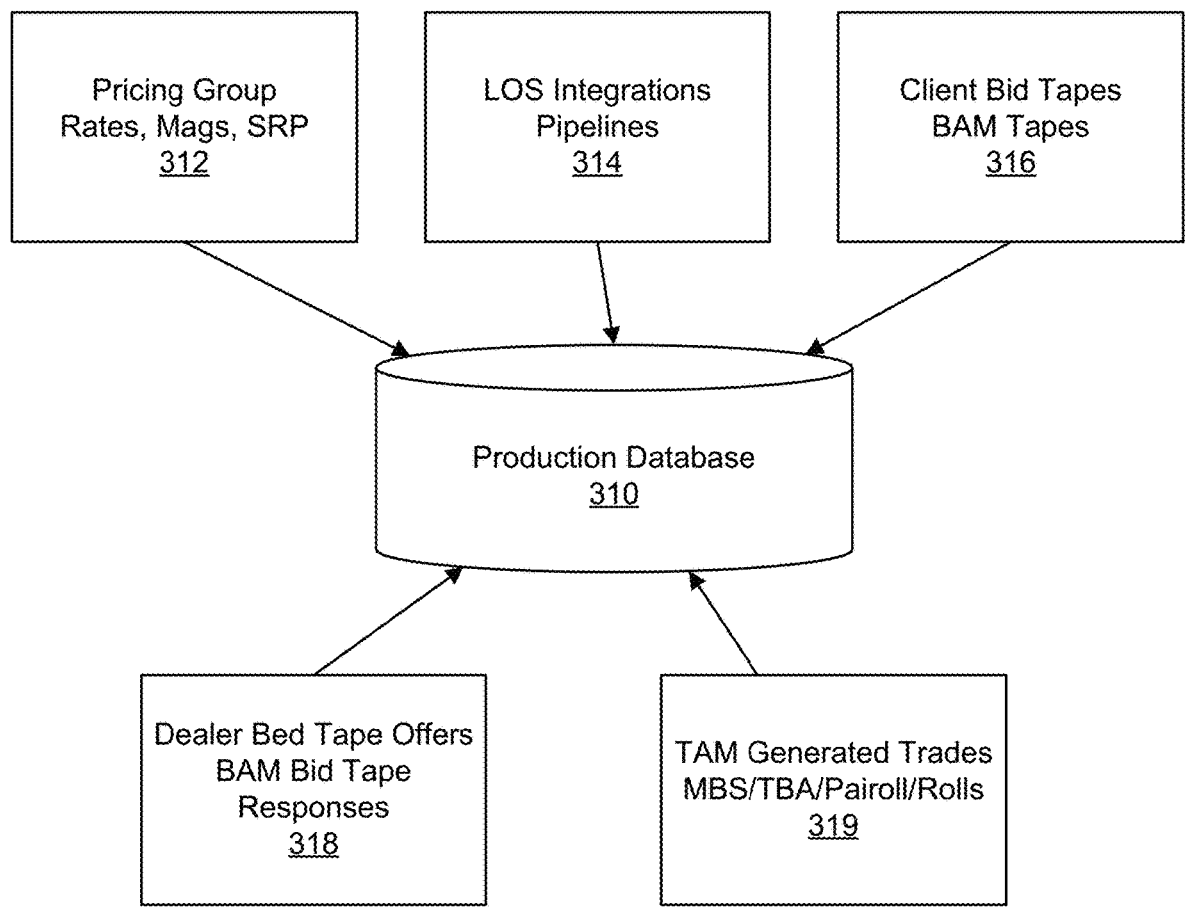
FIGS. 18-23 are high level overviews of the data flow in the computer system(s), platforms, modules and associated methods of one or more embodiments of the instant disclosure.

FIG. 18 provides an overview and illustrative data flow charts for the computer system platforms, modules, and some of the methods associated therewith of the present disclosure. In particular, they illustrate how the exemplar MCTLive!® Platform embodying elements of the computer system and methods of the present disclosure obtains information and input from multiple sources for the central database and serves as the base platform of the independent but collaborative TAM and BAM system platform modules and related methods as disclosed herein. In these embodiments, the central database is referred to as the MCTLive!® production database 310.

As illustrated in FIG. 18, the information and input to the computer system and methods of the present disclosure can include one or more collections of loan pricing data 312, LOS Integrations (i.e., loans for sale held by the seller) 314, information on available loans for the Investor (e.g., bid tapes which provide information on multiple loans for sale that allows for the Investor to make live bids on each loan independently rather than an all-or-nothing bid on the entire package of loans represented in the bid tape) 316, the BAM bid tape offers and responses as discussed above for transactions utilizing the Bid Auction Manager (BAM) platform system module and related methods 318 of the computer trading system platform and related methods of this disclosure.

Trades of financial instruments, including mortgage loans for MBS products, are facilitated by the platform system and related methods are, as discussed above, finalized in the Trade Auction Manager module platform (TAM) 319. Access to the system and related methods disclosed herein relating to the transfers of financial instruments, including mortgage loans for the secondary loan marker, can be accomplished through any available access venue. As examples, the embodiments discussed hereafter include participants accessing the platform system and associated methods via the web access portal for MCTLive!® and participants accessing the system and associated methods via an API access portal.

FIGS. 19-23 also illustrate access to the overall system and associated methods, as well as access to the independent but collaborative platforms and modules, and related methods thereof, as set forth in the present disclosure hereof rather than solely through serial emails or calls to disparate persons and entities. Any form of access can be used and permit the user to obtain the advantages of the platform system and associated methods, and the instant disclosure is not limited to any particular web portal access and/or API.

As discussed above, one or more of the embodiments depicted in FIG. 18 include a first collection of data organization and movement is identified for reference purposes as "Pricing Group" data and data flow 312. This data includes loan rates, Mags and SRP. Mags are rate charts for comparable securities which allow a Lender to estimate the price for a trade. SRP represents the service release price, which is the cost of the entity who services a loan (e.g., collects the payments and any late fees and enforces the terms of the note in cases of default) associated with the loan. This, like other costs and fees discussed herein, impacts the profitability of the loan transaction to the Lender. Information for the pricing group collection is either provided to the system operator or retrieved by the system operator from publicly available information sources on the internet.

Figure 19:
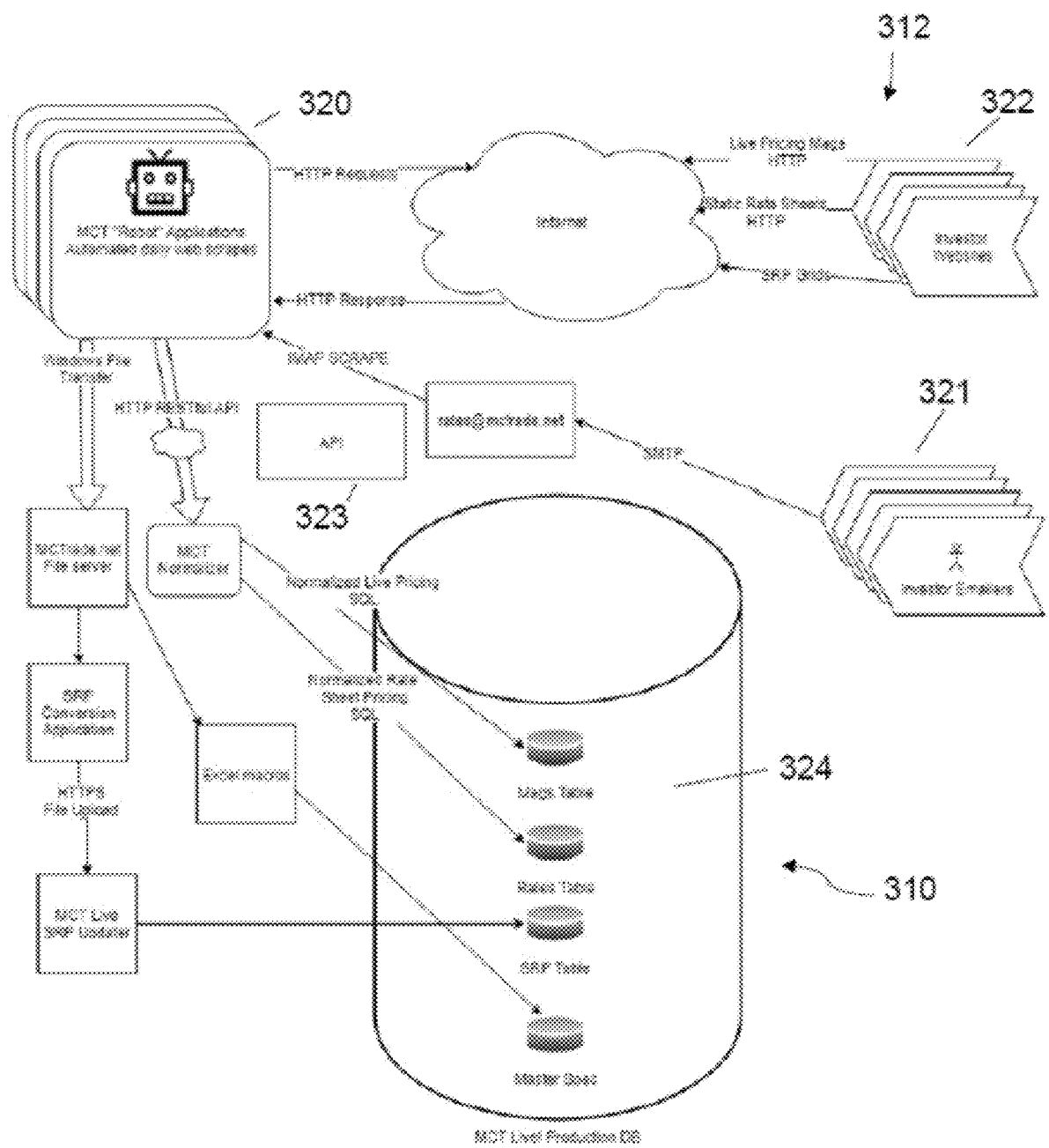

FIG. 19 is an expansion of the Pricing Group collection of data flows and information 312 identified in FIG. 18. As reflected in FIG. 19, one or more embodiments of the trading system and associated methods includes automated applications 320 prearranged to obtain certain information over the internet from various sources 322 including Investor websites, SRP grids, static rate sheets and live pricing Mags.

Figure 17:
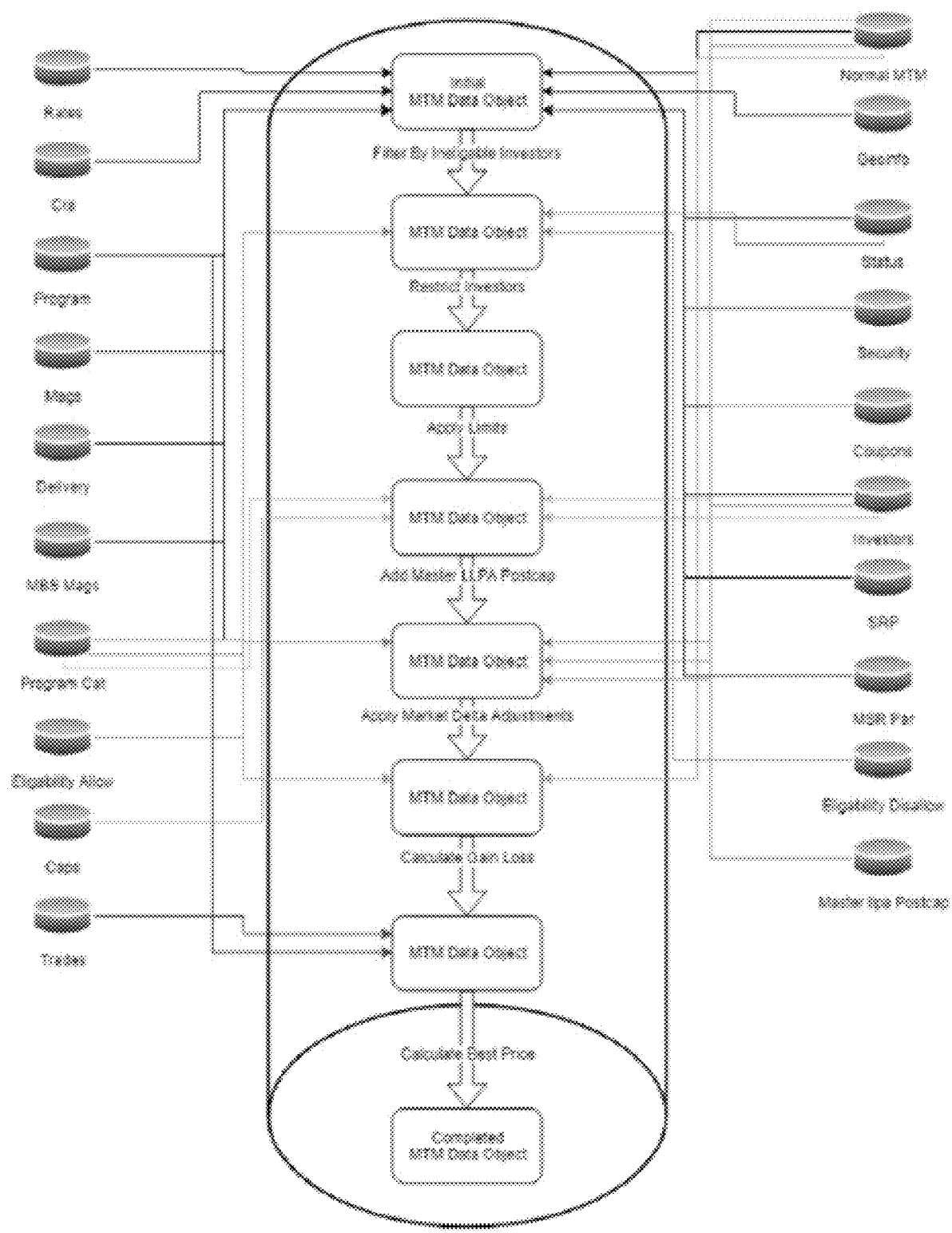
FIG. 17 is a data flowchart illustrating the data flow in the Best Execution analysis of one or more embodiments of the computer system(s), platforms and associated methods of the instant disclosure.

In addition, the automated applications 320 of the trading system and platform and related methods can also receive information from Investor emails 321 and/or from one or more API access portals 323. The automated applications 320 reflected in FIG. 19 are, in a preferred embodiment, windows based applications which will create database files 324 of uploaded information scraped or obtains from multiple websites or other online information sources. As reflected in the flowchart of FIG. 19, information collected by the automated system and related methods is normalized to be reformatted into an environment utilizable by the system database 310 for further use in the trading system and related methods of the present disclosure. In addition, as reflected in FIG. 17, the information database files are used in one or more embodiments of the platform modules and methods of the present disclosure in, for example the Best Execution analysis.

Figure 20:
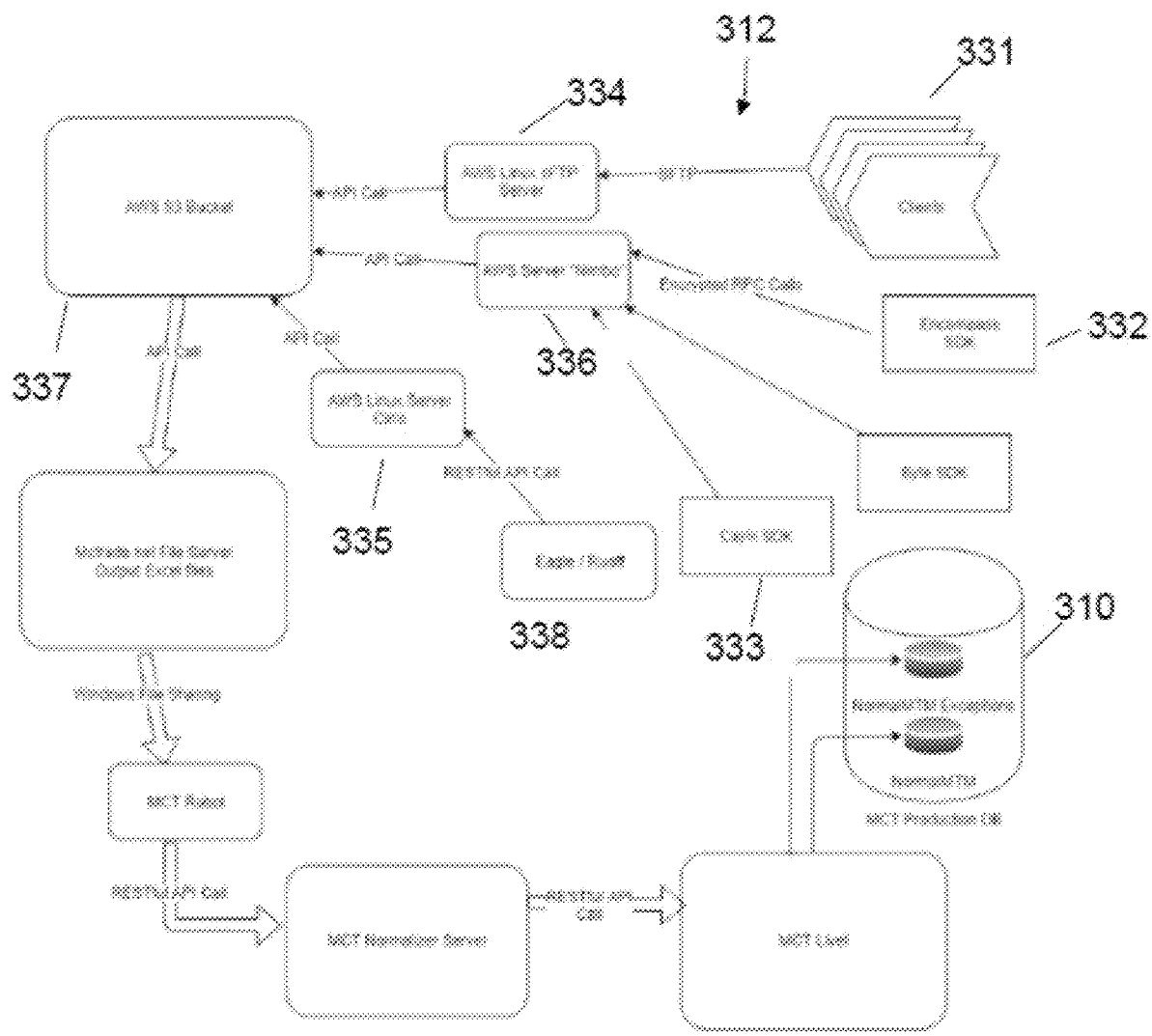

Another group of information and data is represented in FIG. 18 as LOS integrations and pipelines 314. This is information from the Lender's loan origination system and includes lists of available loans or loan commitments to potential borrowers in the Lender's loan pipelines. FIG. 20 is a more detailed representation of the collection of LOS Integrations 314 reflected in FIG. 18 above. The LOS Integrations collection of data and information 312 receives data and information from multiple sources and systems including from Lenders, and systems used by participants in the MBS market such as the Eagle/Ruoff system 338. The platform is able to interact with such systems (and systems such as Encompass 332, Calyx 333) and can utilize multiple data transfer protocols including sFTP.

In a preferred embodiment, the portion of the system and related methods of the present disclosure which addresses LOS Integrations includes a series of parallel servers, one of which is preferably a Linux FTP server 334 dedicated to information from clients, a second Linux server 335 receiving information from Eagle/Ruoff, which might be a system dedicated to a single client. A third server referenced "Nimbo" 336 receives information from various third party systems such as Calyx 333, Encompass 332 and/or Byte, among others. These servers provide information to a central repository upon receipt of an API call from the repository, identified as AWSS3 bucket 337 in FIG. 20 and will be used as is understood by one of skill in the art.

As reflected in FIG. 20, this collated data is passed to another server in response to an API call which normalizes the data into excel files for integration with the MCTLive!® system and related methods disclosed herein. In a preferred embodiment, the system may use an additional automated application or robot to arrange, address and feed excel sheets to a normalizer. The normalized data is collected by an additional server identified as "MCT Normalizer Server" in FIG. 20 which retains and disburses normalized data to the MCT Live! loan trading and mortgage back security system of the present disclosure. The purpose of the LOS Integration is to obtain normalized tables of marked to market (MTM) data and exceptions. The tables of normal MTM and normal MTM exceptions is preferably utilized in the present system and related methods in conjunction with the hedging analysis and/or as part of the Best Execution analyses as described above and herein.

A third type of data and information collection is represented in FIG. 18 as client bid tapes and responses 316, preferably through the BAM platform system module and related methods. These are lists of loans provided by banks that contain information Investors need in order to evaluate and make offers. BAM bid-tapes refers to bid-tapes generated by the BAM system platform component of the present disclosure, discussed above. The BAM platform system module and related methods tapes include proposals made by Investors seeking to financial instruments (such as mortgage loans for the secondary mortgage market) and responses of Investors or customers for the financial instruments being sold or traded, each as discussed herein.

Figure 21:
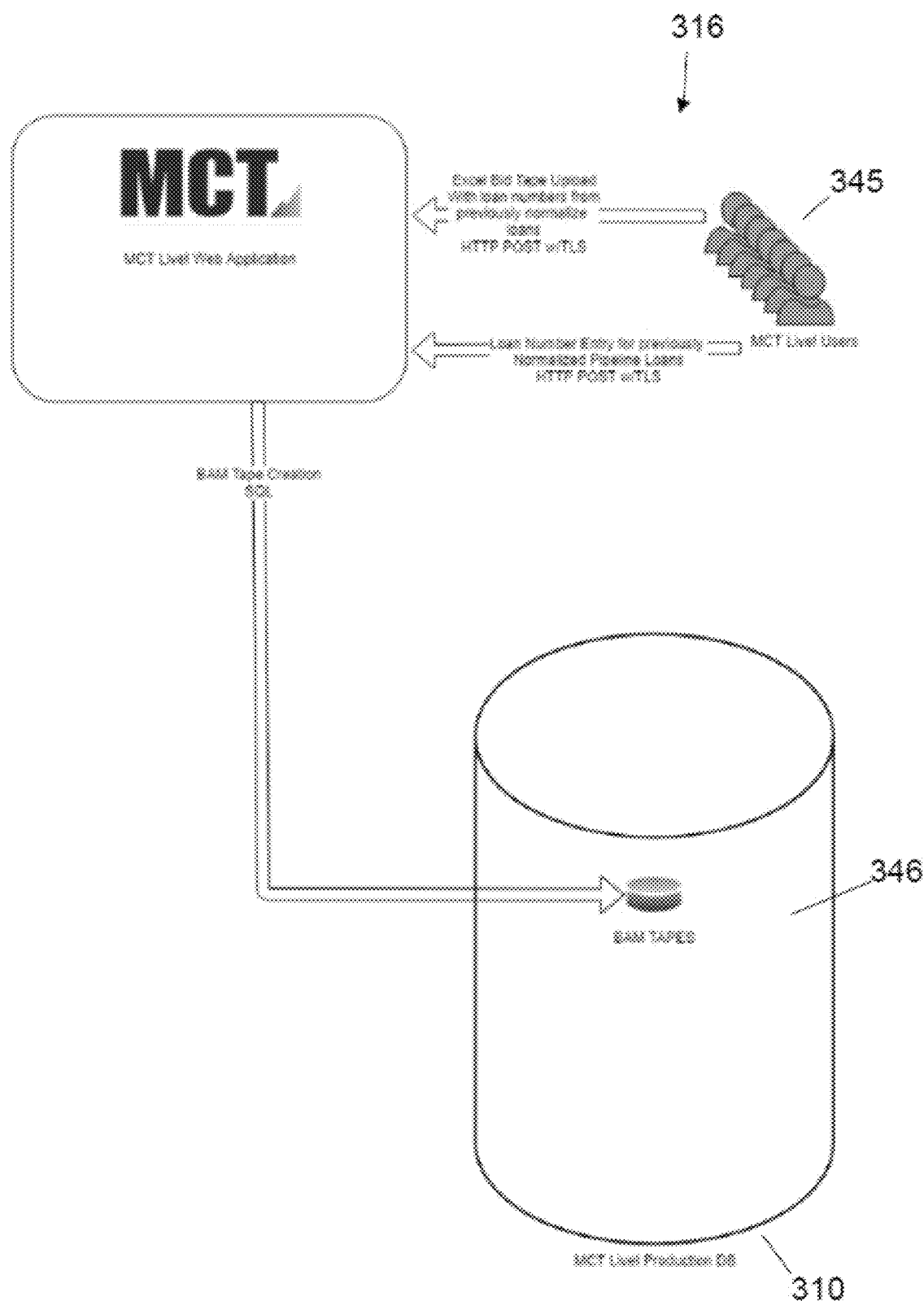

This collection of data and information also includes Dealer bid tape offers and/or BAM bid tape responses as discussed above. FIG. 21 reflects the client bid tape collection of information 316. As illustrated in FIG. 21, users 345, who are depicted for convenience as logged into the MCT Live! master platform system through a web-based portal, can provide information relating to loans for sale. Loans can be provided either in the form of a bid tape upload from previously normalized loans or information from previously normalized pipeline loans. As illustrated in FIG. 21, the MCTLive!® production database 310 will include information related to Bid Auction Manager tapes 246 from MCTLive!® Users 345. This system includes an automated system to pull data using an FTP protocol from secure customer databases or data storage components.

Figure 22:
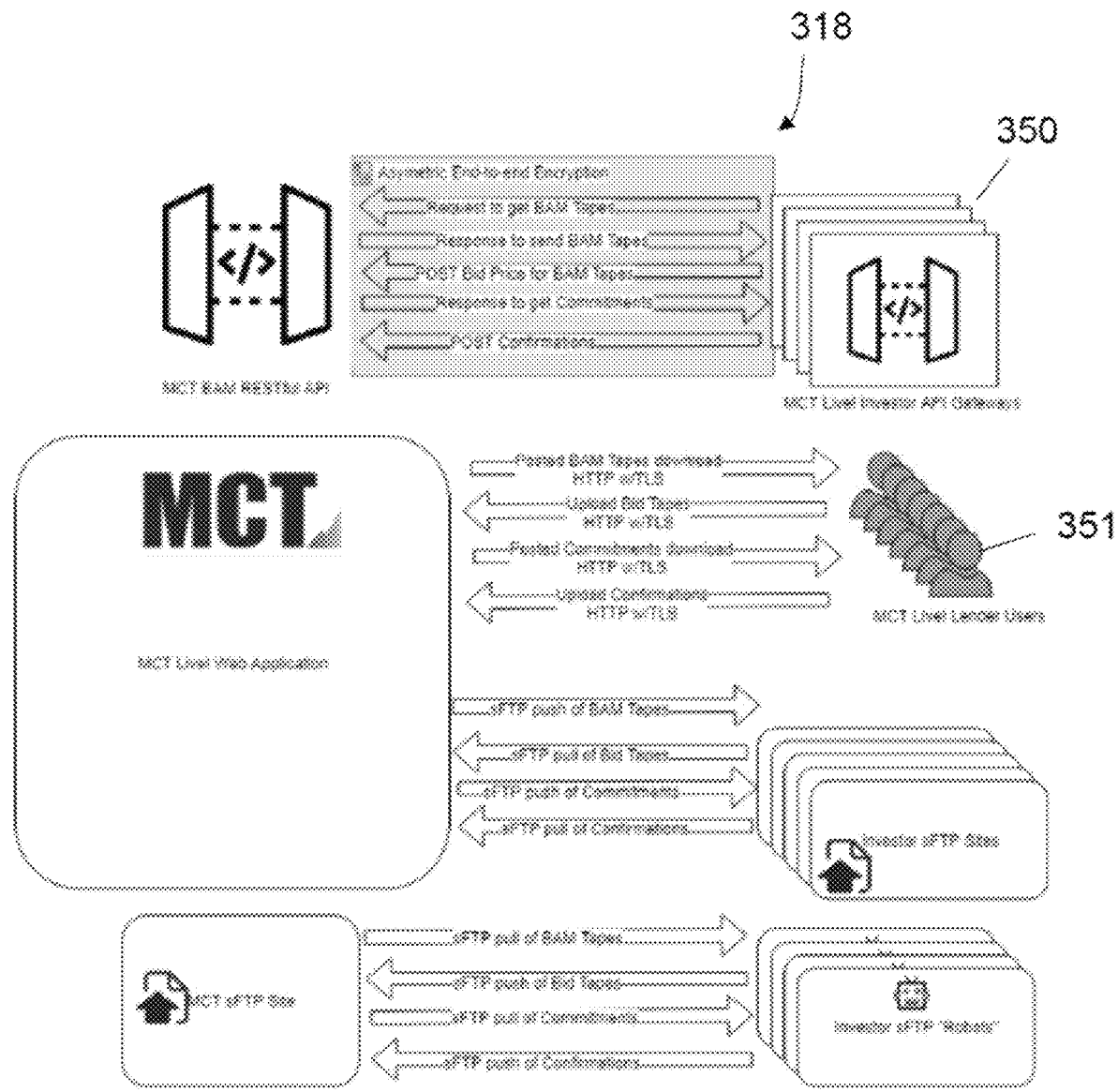

FIG. 22 is a further depiction of the Investor bid data flow 318 described above and in conjunction with FIG. 18. As reflected in FIG. 22, Investors come into the MCTLive!® system either by using an API access portal 350 (such as FANNIE MAE) or through an MCTLive!® web based portal 351 of the present system. As reflected in FIG. 22, the present system is able to use asymmetric end to end encryption and/or double encryption depending on the dictates of the Investor. As discussed above in association with the illustrative screen shots, the data flows of the system platform and modules, and the related methods of the present disclosure, enables the bid tapes to be secured, proposals to be posted in response to the bid tapes as responses to the proposals in order to create commitments, and confirmations of the commitments, all to be exchanged in a secure environment.

In certain instances, rather than using asymmetric end to end encryption, it is possible to use only transport layer encryption so as to minimize the delay and computational burden on the system.

The final type of information and data collection referenced in FIG. 18 is identified as TAM platform system module and related methods generated trades 319. These are trades of financial instruments, including but not limited to TBAs, preferably using the TAM module of the computer system and associated methods of the present disclosure as discussed above. TAM platform system module and related methods trades can include, but are not limited to, TBA trades and/or trades of mortgage backed securities, or participation in AOT trades as discussed above. An embodiment of the present system can include API trading based on particular application programming interfaces available to market participants, such as a GRE like FANNIE MAE, to directly access the system, platform and related methods of the present disclosure for trading financial instruments. Other Investors as well as sellers, Broker-Dealers and clients may alternatively utilize an API portal or a web based access to portal to the trading system and related methods discussed herein. Alternatively, as mentioned above, all parties can utilize a web based access portal to the instant system and related methods and/or provide directions, bids, offers and/or confirmations by telephone, email or other means of communicating in order to secure transactions in the trading system and platform of the present disclosure and related methods as discussed herein. In these circumstances, a trading representative would input the data into the trading system and platform disclosed herein so that the transactions could be accomplished in the manners discussed, and using the methods disclosed, herein.

Figure 23:
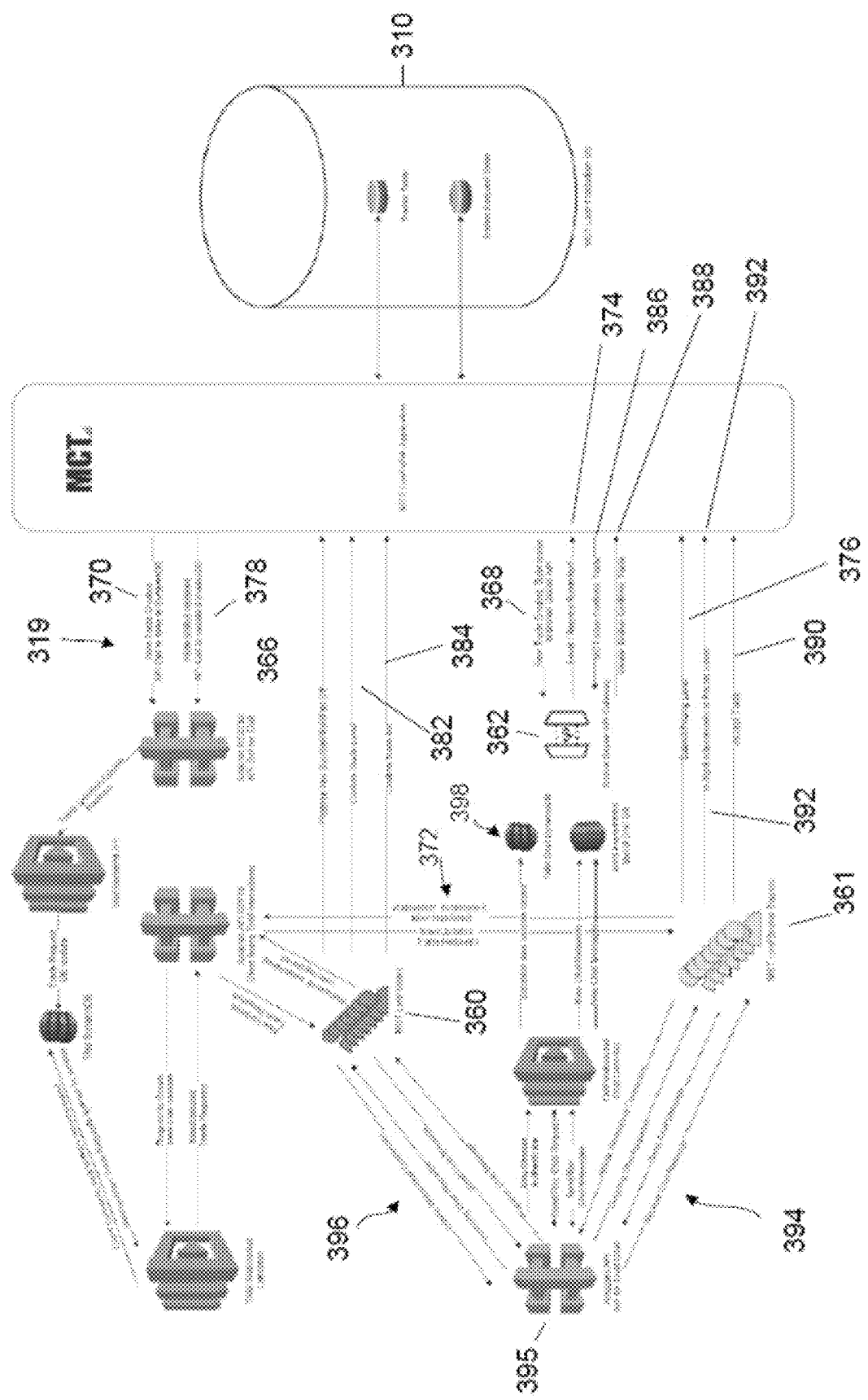

FIG. 23 illustrates the TAM platform system module and related methods data flow 319 for the exemplary MCTLive!® platform and associated methods of the present disclosure as illustrated in summary in FIG. 18 above. As illustrated in FIG. 23, the TAM module of the MCTLive!® platform and related methods enables different constituencies to interact and create transaction requests and acknowledgements for various financial instruments including for mortgages for the purposes of creating mortgage backed securities and/or hedges on mortgage based investments.

As illustrated in FIG. 23, this embodiment of the MCTLive!® platform and methods interconnects Lenders 360 (represented by the series of blue heads in the center of FIG. 23), Broker-Dealers 361 (represented by the series of heads in the lower portion of FIG. 23) who access the MCTLive!® platform through the web based application and additional Broker-Dealers 362 who access the platform directly through an API connection. Typically, bulk buyers will access the trading system platform module and associated methods disclosed herein directly through an API rather than by logging onto a web based application.

Fundamentally, as illustrated in FIG. 23, the client-Lenders 360 will provide information to the pool of buyers (which include Broker-Dealers and/or GSE's) as represented by a communication arrow 366. The platform and associated methods of the instant disclosure transmits the new proposed transaction 366 to Broker-Dealers 364 accessing the platform via API through communication 368. In addition, the new trade proposal 366 is communicated to the TAM platform system module and related methods by communication 370 of the system platform and associated methods. The TAM module processes the new trade request communication 370 and communicates with the Broker-Dealers accessing the platform through one or more web application portals via communication 372.

As discussed above, in connection to the illustrative screen shots for a TAM execution, the Broker-Dealers, regardless of how they access the platform, then respond to the proposal from the client-Lender either utilizing the API gateway (communication 374) or through communication to the system through the web application (communication 376). These responses are communicated to the TAM platform system module and related methods through the web application. In communication 378, the TAM platform system module and related methods communicates the offers and proposals to the client-Lenders in communication 380. The client-Lenders utilize communication channels 382 and 384 to confirm proposals selected by the client-Lenders from the various Broker-Dealer responses. These responses can be on a financial instrument by instrument basis or on a pool of instruments tied together. This arrangement enables client-Lenders to select the best transaction amongst various proposed transactions, including combinations of various instruments or loans, amongst the plurality of proposals received by the client-Lender for each particular loan or financial instrument. The confirmation of the transactions between the Lender and Broker-Dealer are communicated either through communication channel 386 or 372 depending on whether the Broker-Dealer Investor is connected to the TAM system platform module directly through an API portal or through a web application access portal. The above-discussed confirmation of the trade from the Broker-Dealer is communicated back to the client-Lender through communication channel 388 or 390.

As some Broker-Dealers do not view the sale as completed until the final confirmation from the Broker-Dealer is sent to the Lender, the system data flow allows for Broker-Dealers who access the platform through the web application to make adjustments to the pricing levels prior to confirmation of a trade through communication channel 392. This is why a Lender is ill-advised to close a sale of a loan on the BAM system platform module prior to receiving the final Broker-Dealer confirmation of the hedge trade.

In addition, as illustrated in FIG. 23, the trading platform and related methods facilitate direct communications between client-Lenders and Broker-Dealers who access the platform through one or more web based application portals. Accordingly, the instant system provides a gateway and channels 394 and 396 for chat requests and messages to communicate between client-Lenders and Broker-Dealers logged into the web application. These chats are recorded and available for later inspection or audit.

The API chat gateway 395 is preferably a serverless web socket lambda design which enables the chatting using the Broker-Dealer communication channels 394 and the client-Lender communication channels 396. All chat communications are retained, together with metadata related to the time and identification of the persons chatting by the platform through storage arrangement 398.

As reflected in FIGS. 18-23, various parts of the data flow of the system platforms and modules and the related methods are implemented through serverless web socket designs. This approach is novel for these applications and provides the embodiments of the systems, platform modules, and the methods of the present disclosure, with significant advantages in operational efficiency, speed of transmission and security which have heretofore been unattainable in prior art systems.

Locked Security Spread

In order for parties to enter into a purchase/sale of a loan or loan commitment from a Lender to an Investor, it is necessary for the Lender and Investor to each have any respective approvals associated with such a transaction in place prior to the parties entering into a contract for the purchase/sale of a loan. As mentioned above, this is referred to as being a Qualified Investor. Approval of a particular Lender by an Investor may include an evaluation of the capitalization of the Lender, the market place in which the Lender typically operates, the nature of the Lender's Borrowers, the Lender's fallout rate (i.e., the percentage of loan commitments that are abandoned by a Borrower to seek better terms) and various other factors that are known to persons of skill in the industry. Likewise, the approval of an Investor by a Lender may involve an evaluation of the Investor's liquidity, the Investor's history of purchasing loan collateral, special pricing offered by the Investor and various other factors that are known to persons of skill in the industry.

The time and effort necessary to compile the information and obtain the appropriate approvals from both Lenders and Investors results in Lenders having a limited number of Qualified Investors for loans it sells in the secondary mortgage market. For example, a Lender may be approved by four to six buyers in a market place where 70 to 100 buyers may be purchasing comparable loans. Even as information exchange and approval processes have been streamlined, typical Lenders only have approximately 10 to 20 buyers who are Qualified Investors to whom the Lender can propose sales or trades of loans in its loan production pipeline. The number of Qualified Investors is far less than the number of interested Investors (e.g., it can be less than 10% of the total available buyer market). The remaining Investors who would be interested in purchasing loans from the Lender are not able to do so because of the lack of in place approvals by the Lender and the Investor. This artificial segmentation of the market causes inefficiencies and prohibits buyers and sellers from realizing the best implementation of the market place for securities including, by way of example, mortgage loans for sale in the secondary mortgage market.

To overcome these failings of the system, one or more embodiments of the trading platform described herein allows for unapproved buyers to make unqualified bid proposals to Lenders in order to allow the Lenders to better understand the true market value of a particular security (e.g., a loan or loan commitment) to unapproved Investors. As discussed above, these unqualified bids can be referred to "shadow bids" because they are reflective of the market price for a particular security but cannot be accepted by the Lender/Seller. Shadow bids can help a Lender properly price products being sold or traded, and they can assist the Lender in developing long term relationships that become Qualified Investor relationships. But shadow bids do not solve the problem of the artificially segmented market as a Lender is not able to accept a shadow bid and convert it into a current transaction. Additionally, the volatility of the market (e.g., changing interest rates and prices) during a delay to obtain approvals associated with creating a Qualified Investor relationship make it impossible to accept a shadow bid for a particular transaction. If a shadow bid were sufficiently compelling, the parties can attempt to complete the process of becoming a Qualified Investor to close the trade and actually consummate a transaction. This would be an extremely rare circumstance, however, given the volatility of the secondary loan market.

To overcome these limitations, one or more embodiments of the systems, platforms and associated methods of the present disclosure enables the parties to effectively make a binding bid and sell proposal which is subject to the later approval of the Lender/Seller and the Investor/buyer by the respective parties prior to the execution of the trade.

There was precipitous volatility experienced in March-April of 2020, during the initial response of the United States financial markets to the government shut-down orders associated with responding to the coronavirus pandemic in the United States. During this time, certain GSE (government sponsored enterprise) buyers were not permitted to purchase securities, such as a mortgage loans, where a forbearance was applicable to such security. These conditions caused a near lockup of the secondary security market for mortgage back loans because of the lack of sufficient approved buyers and Sellers in the market place. Shadow bids were not useful in this circumstance as it was not possible to execute trades based on a shadow bid.

To address these and other shortfalls of the current system, one or more embodiments of the present trading system enables any Seller/Lender to enter into an agreement with any buyer/Investor that locks in the spread between the prevailing relevant prices for a particular security (e.g., a mortgage loan in the secondary mortgage market) pending completion of the Qualified Investor process. By way of example, if an Investor is willing to pay 105 for a particular loan and the corresponding TBA price for that loan is 104, the difference between these prevailing relevant prices (i.e. the "Security Spread") is plus 1. In one or more embodiments of the trading system of the current disclosure, the parties are able to lock the loan commitment Security Spread as it relates to a particular loan. The actual price of the loan continues to float with the market pending the completion of the Qualified Investor process necessary to finalize an actual trade. Once in place, the locked-in Security Spread loan commitment is applied to the then-current price of the loan regardless of the actual price of the loan at that time. Accordingly, the trading system of the current disclosure secure and establishes the relative position of each of the parties to a transaction without locking the price applicable to the loan until the trade is able to be closed.

This Security Spread lock feature protects both the seller/Lender and the buyer/Investor from changing interest rates and loan price market conditions during the period between when the Security Spread is locked and the closing of the transaction. The Lender/Seller is able to enter into a binding agreement to transfer the loan at a Security Spread that is locked regardless of the final price. The Lender/seller will maintain their hedge as protection against market changes in prices or rates of the loan until the loan transfer closes. It is not possible under current or prior systems or trading environments for the Lender/seller to enter into a contract to lock in a sale while maintaining protection from adverse changes in market conditions pending the closing of the sale. This opens the door for Lenders/sellers to establish new client relationships on an operating basis.

Likewise, the buyer/Investor is protected as they have not committed to a price for the loan and thus do not have to initiate a hedge to protect their purchase from price fluctuations of the loan. The buyer/Investor will know that the final price of the loan will fluctuate with the market until the transaction is closed. These embodiments of the present systems, platforms and methods are advantageous for Investors/buyers as it allows them to establish new relationships for the purchase of loan from a viable Lender/seller.

Figure 24:
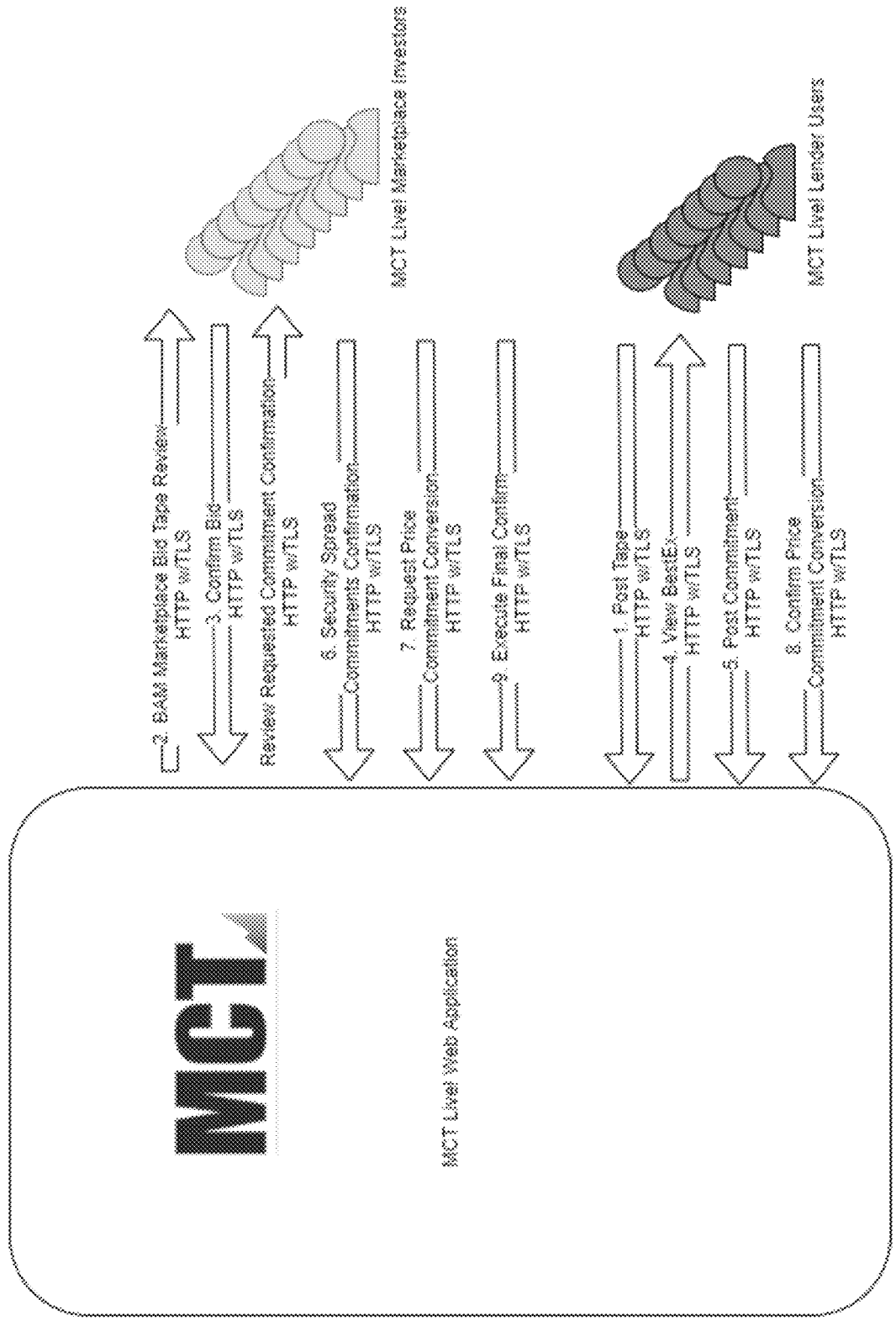
FIG. 24 is a chart showing the data flow in the systems, platforms and modules, and related methods of the present disclosure including the Spread Security lock of the instant disclosure; and The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

By way of example and without limiting the application or the instant disclosure, the Security Spread lock is illustrated in FIG. 24 in connection of a typical loan sale transaction using the BAM system platform module and related methods of the present disclosure. As illustrated in FIG. 24, the first step (labeled as data flow "1" in the Figure) is for the Lender/Seller to seek bid requests for commitments on one or more loan products from one or more approved Investors/buyers. In the BAM platform module, this is done by posting a bid tape.

In response to the request for bids, any Investor accessing the BAM platform module and related methods can receive the Lender's submission for one or more of the loans for which the Lender is soliciting bids. This is illustrated as data flow "2" on FIG. 24. In so doing, the Qualified Investor can submit a price execution bid and an unqualified investor can submit a Security Spread loan commitment bid. Additionally, the Investor can select the loans and modify their bids for the loan on which they desire to bid. The Investors then confirm their bids for the loans at issue, data flow "3" in FIG. 24. Any Investor, regardless of whether they are a Qualified Investor, is thus able to provide a proposed commitment for the purchase of one or more loans offered by the Lender.

The BAM platform module will provide a Best Ex analysis of the bids (both price execution bids and Security Spread loan commitment bids) to the Lender. This is shown as data flow "4" on FIG. 24. The next action is for the Lender to select which bids it accepts from the various Investors. The Lender/Seller evaluates the bids and determines which best fit its overall needs. Once decided, the Lender posts a confirmation of the accepted bids, which is reflected as data flow "5" in FIG. 24.

The next communication is a confirmation of the bid acceptance by the Investor. A Qualified Investor can provide a Price Commitment confirmation while an unqualified Investor can provide a Security Spread bid commitment. As discussed above, when a Qualified Investor receives a bid confirmation from a Lender for a loan, the Investor sends a confirmation of the bid acceptance and the transaction closes. When an unqualified Investor receives a bid confirmation from a Lender for a Security Spread bid, the Investor provides the Lender with a Security Spread bid confirmation. These commitments from the Investor are represented as data flow "6" in FIG. 24.

The systems, platforms, modules and related methods described in the present disclosure to permit users (e.g., an Investor or a Lender) to monitor all of their outstanding Security Spread commitments. To move forward with the transaction after a Security Spread commitment has been provided and the Investor has become a Qualified Investor, the Investor will make a request to the Lender for a price commitment conversion, thus asking the Lender to convert the Security Spread into a loan price. This request is shown as data flow "7" on FIG. 24. The Lender is notified of this price commitment conversion by the systems, platform modules and related methods of the present disclosure.

Once an Investor who is part of a Security Spread loan commitment becomes a Qualified Investor and has made a request of the Lender for a price commitment conversion, the Lender will reply with a price commitment conversion for the Security Spread in place between the parties. This is determined by using the then-current applicable market prices for the loan and applying the Security Spread thereto. This is reflected as data flow "8" in the data flow diagram of FIG. 24. Thereafter, the Investor provides a final confirm of the price conversion commitment to the Lender. This is shown as data flow "9" on FIG. 24.

The Lender is notified of the final confirmation of the price conversion commitment. The systems, platform modules and methods of the instant disclosure send the Investor a final confirmation, which is equivalent to a receipt, of the transaction.

The trading platform in one or more embodiments of the system and related methods described in the instant disclosure permits the traditional submission, bidding and commitment process for Qualified Investors to proceed concurrently with the unprecedented Security Spread lock process for unqualified Investors, for the benefit of Lenders/sellers and Investors/buyers. Additionally, embodiments of the trading platform and system, and methods associated therewith, allow for unapproved Lenders/Sellers and buyers/Investors to consummate the sale based on a locked Security Spread commitment and then close the sale at the actual market price once the approvals have been obtained. This provides certainty to both parties to the transaction, and facilitates the most efficient implementation of the market opportunities for both parties.

Thus, in one or more embodiments of the system and trading platform, and the related methods, each described herein, after bids are received by the Lender/seller for the security/loan at issue, the seller/Lender requests commitments from buyers/Investors using the system of one or more embodiments of the trading platform in the instant disclosure. Unlike all conventional systems, however, the Lender/seller makes the commitment request for the applicable security (e.g., one or more mortgage loans in the secondary loan market) from any interested Investor/buyer rather than just from Investor/buyers who are presently Qualified Investors.

The seller/Lender then has the option of selecting an Investor/buyer commitment from the Investors/buyers to purchase either the security/loan using the four typical communications for a transaction as discussed above or a commitment to a Security Spread from an unqualified buyer/Investor through the embodiments of the trading platforms and related methods described herein. A Qualified Investor will confirm the commitment to the price of the security/loan so the transaction can close while an unqualified Investor will confirm a commitment to a Security Spread (and not a price of the underlying security. If the Lender/seller choses the bid from a Qualified Investor/buyer, then the transaction can close at the agreed-upon price and the Lender/seller is able to pair off any hedge related to that security/loan.

Where the Lender/seller choses to accept a Security Spread commitment from an unapproved buyer, instead of locking in the price of the loan/security, the parties will lock in the Security Spread applicable to that security/loan, understanding that the actual price of the security/loan will continue to float based on market conditions. Thus, the seller/Lender sends the unapproved Investor/buyer a request for a Security Spread lock commitment and the unapproved Investor/buyer provides a confirmation of the Security Spread lock commitment. Once the Investor/buyer becomes a Qualified Investor, the Investor/buyer requests a price commitment conversion based on the locked Security Spread from the Lender/seller. The Lender/Seller confirms the price commitment conversion and the transaction closes. Each of the parties' relative position is preserved during the time it takes for the buyer/Investor to become a Qualified Investor. Once the transaction closes, the Lender/seller can pair out any hedge position it holds on the loan/security.

The systems, platforms, modules and related methods of the present disclosure greatly expands the number of eligible market participants for Lender/sellers to enter into agreements to sell and/or purchase securities in the applicable market, including by way of example but without limitation, mortgage loans in the secondary loan market. This innovation removes, for the first time, the artificial segmentation of the market that has historically limited sellers to only deal with Qualified Investors and has prohibited buyers from purchasing loans/securities from only those sellers with whom they are qualified prior to the time they receive the opportunity to submit bids for the security/loan.

A system for managing mortgage loan pipelines held by a lender and for trading mortgage loans in the secondary mortgage market between lenders and one or more investors, the system comprising: a computerized system operative with programming to (i) access information regarding the outstanding mortgage loans and mortgage loan commitments owned by a lender; (ii) generate recommendations for hedge positions to protect the lender from market changes based on said loans and loan commitments; (iii) permit automatic execution of trades with one or more broker-dealers to place hedges in accordance with said recommendations, (iv) receive and transmit requests for bids, bids and bid acceptances for one or more mortgage loans between a lender and one or more investors, wherein said investors are not qualified investors, and (v) access and store information relating to said lender, investors, broker-dealers, hedge recommendations, trade executions, bids, bid acceptances, loans and all communications between said lender and said investors or said broker-dealers; a database for storing a first type of data relating to said lender, broker-dealers, hedge recommendations, trade executions, bids, bid acceptances, loans, requests for bids and bids and communications between said lender and said one or more investors and/or one or more broker-dealers, said database also arranged for storing a second type of data after a bid from an investor is accepted by a lender, said second type of data comprising information about the spread between the price bid by said investor for said mortgage loans and other relevant market prices associated with said mortgage loans including the then-current TBA price for said loans; and, said computerized system further arranged with operative programming to (i) receive and transmit one or more requests to convert said second type of stored data into a sales price for said mortgage loan after said second type of data is stored in said database, (ii) access then-current pricing for said mortgage loan and convert said stored second type of data into a then-current price for said mortgage loan based on the then-current price for said mortgage loans, and (iii) receive and transmit communications confirming the transaction at the price set by said conversion.

A computer-implemented method for managing mortgage loan pipelines held by a lender and for trading mortgage loans in the secondary mortgage market between lenders and one or more investors, comprising: accessing information regarding the outstanding mortgage loans and mortgage loan commitments owned by a lender; automatically generating recommendations for hedge positions to protect the lender from market changes based on said loans and loan commitments; automatically executing trades with one or more broker-dealers to place hedges in accordance with said recommendations; soliciting bids at the direction of the lender from investors for one or more mortgage loans or loan commitments, wherein the investors including one or more unqualified investors; receiving bids for one or more mortgage loans or loan commitments from investors; and, accepting one or more bids from investors, wherein bids accepted from one or more unqualified investors locks in the spread between the prevailing relevant prices and the amount of the unqualified investor's bid but allows the actual price of said loans or loan commitments to float in the market.

A computer-implemented method for managing mortgage loan pipelines held by a lender and for trading mortgage loans in the secondary mortgage market between lenders and one or more investors of claim 2, comprising: converting the locked spread between prevailing relevant prices based on the unqualified investor's bid into a sale price for the loans or loan commitments based on the then-current market price for said loans; and, entering into one or more agreements for the sale of said loans or loan commitments with said investors.

A computer-implemented method for managing mortgage loan pipelines held by a lender and for trading mortgage loans in the secondary mortgage market between lenders and one or more investors wherein: said investors also include one or more qualified investors; and, wherein bids accepted from one or more qualified investors locks in the price of said loans or loan commitments from the qualified investor's bid.

A computer-implemented method of trading loans in the secondary mortgage market comprising: soliciting bids from investors for one or more mortgage loans or loan commitments, wherein the investors including one or more unqualified investors; receiving bids for one or more mortgage loans or loan commitments from investors; and, accepting one or more bids from investors, wherein bids accepted from one or more unqualified investors locks in the spread between prevailing relevant prices based on the unqualified investor's bid but allows the actual price of said loans or loan commitments to float in the market.

A computer-implemented method of trading loans in the secondary mortgage market comprising: converting the locked spread between prevailing relevant prices based on the unqualified investor's bid into a sale price for the loans or loan commitments based on the then-current market price for said loans; and, entering into one or more agreements for the sale of said loans or loan commitments with said investors.

A computer-implemented method of trading loans in the secondary mortgage market wherein: said investors also include one or more qualified investors; and, wherein bids accepted from one or more qualified investors locks in the price of said loans or loan commitments from the qualified investor's bid.

A non-transitory computer-readable storage medium comprising instructions that, when executed, cause a system to: transmit requests for bids from a lender to one or more investors for one or more mortgage loans or loan commitments, wherein the investors include one or more unqualified investors; receive bids addressed to the lender for one or more of said mortgage loans or loan commitments from one or more of said investors; transmit an acceptance of one or more of said bids from said investors, wherein said bids accepted from said one or more unqualified investors locks in the spread between prevailing relevant prices and the amount of said unqualified investor's bid but allows the actual price of said loans or loan commitments to float in the market; receive a request to convert the locked spread between prevailing relevant prices based on the unqualified investor's bid into a sale price for said loans or loan commitments based on the then-current market price for the loan; convert the locked spread between prevailing relevant prices and the amount of the unqualified investor's bid into a sale price for said loans or loan commitments based on the then-current market price for the loan; and, enter into one or more agreements for the sale of said loans or loan commitments with said investors.

A non-transitory computer-readable storage medium wherein: said investors also include one or more qualified investors; and, wherein bids accepted from one or more qualified investors locks in the price of the loan or loan commitment from the qualified investor's bid.

A computerized system for buying or selling mortgage loans in the secondary mortgage market between lenders and one or more investors, the system comprising: a computerized platform operative with programming to (i) receive and transmit requests for bids, bids and bid acceptances for one or more mortgage loans between a lender and one or more investors, wherein said investors are not qualified investors, (ii) to access and store information relating to said lender, investors, bids and said loans; a database for storing a first type of data relating to said requests for bids and bids communicated between said lender and said one or more investors, said data including the identity of the said lender and investors, said database also arranged for storing a second type of data after a bid from an investor is accepted by a lender, said second type of data comprising information about the spread between the price bid by said investor for said mortgage loans and other relevant market prices associated with said mortgage loans including the then-current TBA price for said loans; said computerized system further arranged with operative programming to (i) receive and transmit one or more requests to convert said second type of stored data into a sales price for said mortgage loan after said second type of data is stored in said database, (ii) access then-current pricing for said mortgage loan and convert said stored second type of data into a then-current price for said mortgage loan based on the then-current price for said mortgage loans, and (iii) receive and transmit communications confirming the transaction at the price set by said conversion.

A system for managing mortgage loan pipelines held by a lender, the system comprising: a computerized system operative with programming to (i) access information regarding the outstanding mortgage loans and mortgage loan commitments owned by a lender; (ii) generate recommendations for hedge positions to protect the lender from market changes based on said loans and loan commitments; (iii) permit automatic execution of trades with one or more broker dealers to place hedges in accordance with said recommendations, and, (iv) access and store information relating to said lender, investors, broker-dealers, hedge recommendations, trade executions, bids, bid acceptances, loans and all communications between said lender and said investors or said broker-dealers; and, a database for storing a first type of data relating to said lender, broker-dealers, hedge recommendations, trade executions, loans, and all communications regarding any hedge recommendations, trades, trade executions, and between said lender and said broker-dealers.

A non-transitory computer-readable storage medium comprising instructions that, when executed, cause a system to: access information regarding the outstanding mortgage loans and mortgage loan commitments owned by a lender; generate recommendations for hedge positions to protect the lender from market changes based on said loans and loan commitments; automatically execute trades with one or more broker-dealers to place hedges in accordance with said recommendations, access and store information relating to said lender, investors, broker-dealers, hedge recommendations, trade executions, and all communications between said lender and said broker-dealers.

A computerized system for managing mortgage loan pipelines held by a lender, the system comprising: a computerized platform operative with programming to (i) access information regarding the outstanding mortgage loans and mortgage loan commitments owned by a lender; (ii) generate recommendations for hedge positions to protect the lender from market changes based on said loans and loan commitments; (iii) automatically execute trades with one or more broker-dealers to place hedges in accordance with said recommendations, and, (iv) access and store information relating to said lender, investors, broker-dealers, hedge recommendations, trade executions, and all communications between said lender and said broker-dealers; and, a database for storing store information relating to said lender, investors, broker-dealers, hedge recommendations, trade executions, and all communications between said lender and said broker-dealers.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A computer-implemented method for managing mortgage loan pipelines and for making trade commitments for mortgage loans in a secondary mortgage market between one or more lenders and one or more investors, comprising:

obtaining, by a prearranged automated application, loan pricing information from different pricing sources that provide the loan pricing information in different formats;

receiving, at a central repository from one or more parallel servers, in response to an application programming interface (API) call from the central repository, loan information from different loan sources that provide the loan information in different formats;

collating, at the central repository, the obtained loan pricing information and the received loan information;

normalizing, at a normalizer server, the collated and obtained loan pricing information and the collated and received loan information, wherein the collated and obtained loan pricing information and the collated and received loan information is addressed and fed into a standardized spreadsheet format;

storing the normalized loan pricing information and the normalized loan information in a database;

soliciting bids, using the normalized loan pricing information and the normalized loan information stored in the database, over a computer implemented network for one or more mortgage loans in a pipeline of one or more lenders from one or more investors selected by the one or more lenders, wherein the one or more investors includes one or more unqualified investors;

receiving bids over the computer implemented network in real time for the one or more mortgage loans from a bidding subset of said one or more investors;

assigning a loan commitment for the one or more mortgage loans based upon the received bids; and transmitting messages confirming the assigned loan commitment to an accepted subset of the one or more investors over the computer implemented network in real time;

wherein acceptance of a bid from a qualified investor of the accepted subset locks in a price of the one or more mortgage loans of an assigned loan commitment corresponding to the accepted bid; and wherein acceptance of a bid from an unqualified investor of the accepted subset locks in a spread between a prevailing relevant price and an amount of the bid but allows an actual price of the one or more mortgage loans of an assigned loan commitment corresponding to the accepted bid to float according to market conditions.

2. The computer-implemented method of claim 1, comprising:

entering, over the computer implemented network in real time, into one or more agreements with one or more unqualified investors of the accepted subset; and converting, on one or more networked-based processors, the locked spread into a locked sales price for the mortgage loans in the assigned loan commitment with an unqualified investor of the accepted subset based on a then-current market price for the mortgage loans.

3. The computer-implemented method of claim 1, further comprising:

providing a first application to each of the one or more investors for installation on a remote computer of each investor;

providing a second application to each of the one or more lenders for installation on a remote computer of each lender; and aggregating the one or more mortgage loans in the pipeline of the one or more lenders;

wherein the aggregating of the one or more mortgage loans activates the first application, causing a display of the aggregated mortgage loans on at least one remote computer of an investor and enabling a connection to the database storing the normalized loan information; and wherein the receiving of the bids activates the second application, causing a display of the received bids on at least one remote computer of a lender.

4. The computer-implemented method of claim 1, further comprising:

creating database files using the prearranged automated application, in response to the normalizing of the obtained loan pricing information and the received loan information.

5. The computer-implemented method of claim 1, further comprising:

generating, on one or more networked-based processors, recommendations for hedge positions based on the one or more mortgage loans or the assigned loan commitment to protect the one or more lenders from market changes; and transmitting messages in real time with one or more broker-dealers over the computer implemented network to place hedges in accordance with the recommendations.

6. A computer-implemented method of making trade commitments for loans in a secondary mortgage market, comprising:

obtaining, by a prearranged automated application, loan pricing information from different pricing sources that provide the loan pricing information in different formats;

receiving, at a central repository from one or more parallel servers, in response to an application programming interface (API) call from the central repository, loan information from different loan sources that provide the loan information in different formats;

collating, at the central repository, the obtained loan pricing information and the received loan information;

normalizing, at a normalizer server, the collated and obtained loan pricing information and the collated and received loan information, wherein the collated and obtained loan pricing information and the collated and received loan information is addressed and fed into a standardized spreadsheet format;

storing the normalized loan pricing information and the normalized loan information in a database;

soliciting bids, using the normalized loan pricing information and the normalized loan information stored in the database, over a computer implemented network for one or more mortgage loans in a pipeline of one or more lenders from one or more investors selected by the one or more lenders, wherein the one or more investors includes one or more unqualified investors;

receiving bids over the computer implemented network in real time for the one or more mortgage loans from a bidding subset of said one or more investors;

assigning a loan commitment for the one or more mortgage loans based upon the received bids; and transmitting messages confirming the assigned loan commitment to an accepted subset of the one or more investors over the computer implemented network in real time;

wherein acceptance of a bid from a qualified investor of the accepted subset locks in a price of the one or more mortgage loans of an assigned loan commitment corresponding to the accepted bid; and wherein acceptance of a bid from an unqualified investor of the accepted subset locks in a spread between a prevailing relevant price and an amount of the bid but allows an actual price of the one or more mortgage loans of an assigned loan commitment corresponding to the accepted bid to float according to market conditions.

7. The computer-implemented method of claim 6, comprising:

entering into one or more agreements between the one or more lenders and one or more unqualified investors of the accepted subset over the computer implemented network; and converting, on one or more processors, the locked spread into a locked sales price for the mortgage loans in the assigned loan commitment with an unqualified investor of the accepted subset based on a then-current market price for the mortgage loans.

8. The computer-implemented method of claim 6, further comprising:

providing a first application to each of the one or more investors for installation on a remote computer of each investor;

providing a second application to each of the one or more lenders for installation on a remote computer of each lender; and aggregating the one or more mortgage loans in the pipeline of the one or more lenders;

wherein the aggregating of the one or more mortgage loans activates the first application, causing a display of the aggregated mortgage loans on at least one remote computer of an investor and enabling a connection to the database storing the normalized loan information; and wherein the receiving of the bids activates the second application, causing a display of the received bids on at least one remote computer of a lender.

9. The computer-implemented method of claim 6, further comprising:

creating database files using the prearranged automated application, in response to the normalizing of the obtained loan pricing information and the received loan information.

10. A non-transitory computer-readable storage medium comprising instructions that, when executed, cause a system to:

obtain, by a prearranged automated application, loan pricing information from different pricing sources that provide the loan pricing information in different formats;

receive, at a central repository from one or more parallel servers, in response to an application programming interface (API) call from the central repository, loan information from different loan sources that provide the loan information in different formats;

collate, at the central repository, the obtained loan pricing information and the received loan information;

normalize, at a normalizer server, the collated and obtained loan pricing information and the collated and received loan information, wherein the collated and obtained loan pricing information and the collated and received loan information is addressed and fed into a standardized spreadsheet format;

store the normalized loan pricing information and the normalized loan information in a database;

provide remote access to eligible users over a computer implemented network to the normalized loan pricing information and the normalized loan information;

transmit requests for bids, using the normalized loan pricing information and the normalized loan information, over the computer implemented network from one or more lenders to one or more investors for one or more To-Be-Announced (TBA) securities, wherein the one or more investors includes one or more unqualified investors;

receive bids over the computer implemented network in real time for the one or more TBA securities from a bidding subset of the one or more investors;

assign a loan commitment for the one or more TBA securities based upon the received bids;

transmit messages, over the computer implemented network in real time, confirming the assigned loan commitment to an accepted subset of the one or more investors;

wherein acceptance of a bid from a qualified investor of the accepted subset locks in a price of the one or more TBA securities of an assigned loan commitment corresponding to the accepted bid; and wherein acceptance of a bid from an unqualified investor of the accepted subset locks in a spread between a prevailing relevant price and an amount of the bid but allows an actual price of the one or more TBA securities of an assigned loan commitment corresponding to the accepted bid to float according to market conditions;

receive, over the computer implemented network in real time, a request to convert the locked spread into a locked sale price for the one or more TBA securities of the assigned loan commitment based on a then-current market price for the one or more TBA securities;

enter, over the computer implemented network, into one or more agreements with one or more unqualified investors of the accepted subset; and convert, on one or more processors into the locked sale price for the TBA securities in the assigned loan commitment with an unqualified investor of the accepted subset based on the then-current market price for the TBA securities.

11. The non-transitory computer-readable storage medium of claim 10, further comprising instructions that, when executed cause the system to perform:

aggregating the one or more TBA securities;

wherein the aggregating of the one or more TBA securities activates a first application installed on a remote computer of each of the one or more investors, causing a display of the aggregated mortgage loans on at least one remote computer of an investor and enabling a connection to the database storing the normalized loan information; and wherein the receiving of the bids activates a second application installed on a remote computer of each of the one or more lenders, causing a display of the received bids on at least one remote computer of a lender.

12. The non-transitory computer-readable storage medium of claim 10, further comprising instructions that, when executed, cause the system to:

create database files using the prearranged automated application, in response to the normalizing of the obtained loan pricing information and the received loan information.

* * * * *